US010859417B2

(12) United States Patent
Sasaki et al.

(10) Patent No.: US 10,859,417 B2
(45) Date of Patent: Dec. 8, 2020

(54) THERMAL MASS FLOW SENSOR, METHOD FOR MANUFACTURING THE THERMAL MASS FLOW SENSOR, AND THERMAL MASS FLOW METER USING THE THERMAL MASS FLOW SENSOR

(71) Applicant: HITACHI METALS, LTD., Tokyo (JP)

(72) Inventors: Ryu Sasaki, Mie (JP); Mamoru Ishii, Mie (JP)

(73) Assignee: Hitachi Metals, Ltd., Tokyo (JP)

( * ) Notice: Subject to any disclaimer, the term of this patent is extended or adjusted under 35 U.S.C. 154(b) by 141 days.

(21) Appl. No.: 16/080,767

(22) PCT Filed: Feb. 17, 2017

(86) PCT No.: PCT/JP2017/005816
§ 371 (c)(1),
(2) Date: Aug. 29, 2018

(87) PCT Pub. No.: WO2017/154513
PCT Pub. Date: Sep. 14, 2017

(65) Prior Publication Data
US 2019/0178693 A1 Jun. 13, 2019

(30) Foreign Application Priority Data

Mar. 11, 2016 (JP) .................. 2016-048578

(51) Int. Cl.
*G01F 1/684* (2006.01)
*G01F 1/69* (2006.01)
*G01F 1/688* (2006.01)

(52) U.S. Cl.
CPC ............ *G01F 1/6847* (2013.01); *G01F 1/684* (2013.01); *G01F 1/688* (2013.01); *G01F 1/69* (2013.01)

(58) Field of Classification Search
CPC ........ G01F 1/6847; G01F 1/688; G01F 1/684; G01F 1/69; G01F 15/18; G01F 5/00
See application file for complete search history.

(56) References Cited

U.S. PATENT DOCUMENTS 5,309,762 A * 5/1994 Satoh ........................ G01F 5/00
73/202.5
6,125,695 A * 10/2000 Alvesteffer ........... G01F 1/6847
73/204.27

(Continued)

FOREIGN PATENT DOCUMENTS

JP    S56094597      7/1981
JP    S6287825 A     4/1987

(Continued)

OTHER PUBLICATIONS

Japanese Patent Office, "International Search Report Regarding International Patent Application No. PCT/JP2017/005816", dated Mar. 30, 2017, p. 12 Published in: JP.

*Primary Examiner* — David Z Huang
(74) *Attorney, Agent, or Firm* — Neugeboren O'Dowd PC

(57) ABSTRACT

A thermal mass flow sensor 10 enclosed airtightly in a sealed container 11 under an inert atmosphere for the purpose of suppressing disappearance of a coating layer on sensor wires 13a and 13b in association with use at a high temperature, further comprises an air release pipe 16 that is a pipe which brings an internal space and outside of the sealed container 11 in airtight communication with each other through an air release hole 16a that is a through-hole formed in an outer wall of the sealed container 11. An end of the air release pipe 16 on an opposite side to the air release hole 16a is sealed by plastic deformation to form a sealed part 16b. Thereby, after forming the sealed container 11 under a normal atmosphere, the internal space of the sealed container 11 can be closed airtightly. The sealed part 16b may be further sealed (Continued)

by welding. The sealed container 11 can be assembled easily and accurately in this way, and degradation in airtightness of the sealed container 11 in association with use at a high temperature can be suppressed.

15 Claims, 18 Drawing Sheets

(56) References Cited

U.S. PATENT DOCUMENTS

| 7,437,928 | B2 * | 10/2008 | Bos | G01F 1/6847 |
| | | | | 73/204.22 |
| 2006/0082260 | A1 | 4/2006 | Kinoshita | |

FOREIGN PATENT DOCUMENTS

| JP | H01100433 | A | 4/1989 |
| JP | H02196472 | A | 8/1990 |
| JP | 3167425 | A | 7/1991 |
| JP | 0979880 | A | 3/1997 |
| JP | 2004020418 | A | 1/2004 |
| JP | 4873310 | B2 | 2/2012 |
| WO | 2006043713 | A1 | 4/2006 |
| WO | 2015041255 | A1 | 3/2015 |
| WO | 2015141437 | A1 | 9/2015 |

* cited by examiner

THERMAL MASS FLOW SENSOR, METHOD FOR MANUFACTURING THE THERMAL MASS FLOW SENSOR, AND THERMAL MASS FLOW METER USING THE THERMAL MASS FLOW SENSOR

CLAIM OF PRIORITY UNDER 35 U.S.C. § 371

The present Application for Patent is a National Phase of International Patent Application No. PCT/JP2017/005816, filed Feb. 17, 2017, which claims priority to JP Patent Application No. 2016-048578, filed Mar. 11, 2016, both of which are assigned to the assignee hereof and hereby expressly incorporated by reference herein.

BACKGROUND

Field

The present invention relates to a thermal mass flow sensor, a method for manufacturing the thermal mass flow sensor, and a thermal mass flow meter using the thermal mass flow sensor. More specifically, the present invention relates to a thermal mass flow sensor with improved high-temperature durability of a coating layer on sensor wires, a method for manufacturing the thermal mass flow sensor, and a thermal mass flow meter using the thermal mass flow sensor.

Background

A mass flow sensor has been widely used for the purpose of detecting a mass flow rate of process gas supplied into a chamber in a manufacturing process of a semiconductor, for example. Although various types of mass flow sensors have been known in the art, a thermal mass flow sensor has spread widely among these since the thermal mass flow sensor can accurately measure a mass flow rate of process gas with a comparatively simple structure.

Generally, a thermal mass flow sensor is constituted by a channel through which process gas flows, a bypass prepared in the middle of the channel, a sensor tube which branches from the channel on an upstream side of the bypass and joins the channel on a downstream side of the bypass, a pair of sensor wires wound around the sensor tube, and a sensor circuit including a bridge circuit constituted by the sensor wires and other resistive elements. The above-mentioned bypass is configured so as to have fluid resistance to process gas and branch a part of process gas flowing through the channel into the sensor tube at a fixed ratio. Therefore, a mass flow rate of the process gas flowing through the channel can be determined by measuring a mass flow rate of the process gas flowing through the sensor tube.

When a predetermined electric current is flown through the sensor wires, the sensor wires generate heat, and the heat is given to the process gas flowing through the sensor tube. This heat moves from an upstream to a downstream in association with flow of the process gas. A temperature difference arises between an upstream sensor wire and a downstream sensor wire by this movement of heat, and a difference in electric resistance arises consequently. As a result, a potential difference arises between terminals of the bridge circuit. By detecting this potential difference by a sensor circuit, a mass flow rate of the process gas flowing through the sensor tube can be measured.

Since a predetermined electric current is flown through the sensor wires as mentioned above, at least the surfaces of the sensor wires are generally covered with an insulating coating layer such that a short-circuit (electrical contact) may not occur between the sensor wires and between the sensor wires and the sensor tube. For material which constitutes the coating layer, a function as an electric insulator, a function as an adhesive and a function as a conductor of heat are required. Furthermore, a coating layer which can be thinly formed on the surface of the sensor wire and has flexibility such that a crack may not be generated even when the sensor wire after the coating layer is formed thereon is wound around the sensor tube is preferable. From these viewpoints, organic materials such as resin which has excellent heat resistance, such as polyamideimide and polyimide, for example, have been widely used as material which constitutes the coating layer.

By the way, in a thermal mass flow sensor, the sensor wires are made to generate heat by being flown a predetermined electric current through the sensor wires, in order to give heat to process gas flowing through a sensor tube, as mentioned above. Furthermore, in a case of some kinds of process gas, such as condensible gas, for example, a flow sensor may be used at a high temperature. When a flow sensor is used at such a high temperature for a long time, there is a possibility that material constituting the coating layer may become gas through a chemical reaction with oxygen in atmospheric air to disappear gradually, for example.

When the coating layer has disappeared as mentioned above, there is a possibility that electrical contact may occur between the adjacent sensor wires or between the sensor wires and the sensor tube, for example. When such electrical contact occurs, electrical resistivity of the sensor wire falls, it may become difficult to heat the process gas by energizing the sensor, or sensitivity as a flow sensor may fall. Furthermore, a gap may be generated between the sensor tube and the sensor wires to obstruct the movement of heat, it may become difficult to heat the process gas by energizing the sensor, or sensitivity as a flow sensor may fall.

Therefore, various technologies for suppressing disappearance of constituent material of the coating layer in association with use of a flow sensor at a high temperature as mentioned above have been examined in the art. For example, it has been proposed to enclose non-oxidative atmospheric gas (for example, nitrogen, argon, and other inert gases, etc.) inside a sealed container made of metal and cover the surface of the coating layer with the atmospheric gas by inserting a flow sensor into the sealed container from an opening of the sealed container and thereafter welding and closing the opening in a glove box filled with the above-mentioned atmospheric gas (See, e.g., International Publication No. WO2015/041255)(hereinafter "Patent Document 1"). Moreover, it has been also proposed to put a thermal thermistor flow sensor apparatus in a container having a hermetic seal structure under an inert gas atmosphere and thereafter attach a lid to the container by a resistance welding method or a laser welding method (See, e.g., Japanese Patent Application Laid-Open (kokai) No. H09-079880)(hereinafter "Patent Document 2").

Furthermore, in an electronic device with an IC (Integrated Circuit) chip mounted inside a package with a sealing hole formed in a bottom surface thereof, it has been also proposed to airtightly seal the package by making the inside of the package into a vacuum or an inert gas atmosphere and thereafter heating encapsulant (sealing agent) consisting of solder-based material and disposed in the above-mentioned sealing hole (by irradiating an electron beam and a laser beam, etc.) to make the encapsulant melt (See, e.g., Japanese Patent No. 4873310)(hereinafter "Patent Document 3").

SUMMARY

An aspect may be characterized as a thermal mass flow sensor comprising a sealed container, a sensor tube which communicates airtightly with an inlet and an outlet formed in an outer wall defining an internal space of said sealed container and is housed in said internal space of said sealed container, a pair of sensor wires wound around said sensor tube, a coating layer covering at least a part of said sensor wires, which are wound around said sensor tube, and a hermetic connector which is disposed on said outer wall and electrically connects both ends of each of the pair of said sensor wires with external electrodes disposed outside said sealed container. The internal space of said sealed container is sealed so as to be an inert atmosphere, and said thermal mass flow sensor further includes: an air release pipe that is a pipe which brings said internal space and outside of said sealed container in airtight communication with each other through an air release hole that is a through-hole formed in said outer wall; a cap having an opening and an internal space, in which said sealed part can be housed; and an end of said air release pipe on an opposite side to said air release hole is sealed by plastic deformation to form a sealed part. The cap and said air release pipe are further sealed by welding in a state where said sealed part is inserted in said internal space of said cap through said opening.

Another aspect may be characterized as a method of manufacturing a thermal mass flow sensor that includes a sealed container, a sensor tube which communicates airtightly with an inlet and an outlet formed in an outer wall defining an internal space of said sealed container and is housed in said internal space of said sealed container, a pair of sensor wires wound around said sensor tube, a coating layer which covers at least a part of said sensor wires, which are wound around said sensor tube, and a hermetic connector which disposed on said outer wall and electrically connects both ends of each of the pair of said sensor wires with external electrodes which are disposed outside said sealed container, and said internal space of said sealed container is sealed so as to be an inert atmosphere. The thermal mass flow sensor further also includes an air release pipe that is a pipe which brings said internal space and outside of said sealed container in airtight communication with each other through an air release hole that is a through-hole formed in said outer wall, a cap having an opening and an internal space, in which said sealed part can be housed, an end of said air release pipe on an opposite side to said air release hole is sealed by plastic deformation to form a sealed part, and said cap and said air release pipe are further sealed by welding in a state where said sealed part is inserted in said internal space of said cap through said opening. The method includes:

a first step where said sensor tube, around which the pair of said sensor wires is wound, is welded to a first member that is a member in which said inlet and said outlet are formed, among a plurality of members constituting said sealed container, such that said inlet and said outlet are in airtight communication with both ends of said sensor tube, a second step where both ends of each of the pair of said sensor wires are electrically connected to corresponding terminals of said hermetic connector, respectively, in a second member that is a member in which said hermetic connector is disposed, among the plurality of said members constituting said sealed container, a third step where said air release pipe is welded to a third member that is a member in which said air release hole is formed, among the plurality of said members constituting said sealed container, such that said air release pipe is in airtight communication with said internal space of said sealed container through said air release hole, a fourth step where the plurality of said members constituting said sealed container is welded with one another to form said sealed container, and a fifth step where an end of said air release pipe on an opposite side to said air release hole is sealed by plastic deformation to form said sealed part, after discharging air from said internal space through said air release pipe, and in said fifth step, a cap having an opening and an internal space, in which said sealed part can be housed, and said air release pipe are further sealed by welding in a state where said sealed part is inserted in said internal space of said cap through said opening after forming said sealed part.

Yet another aspect includes a thermal mass flow meter that includes a base which has one installation surface and has a channel for fluid prepared in the inside of said base, a bypass disposed in the middle of said channel, a thermal mass flow sensor (variations are disclosed herein), a sensor circuit including a bridge circuit constituted by said sensor wires and other resistive elements, wherein said sensor tube is configured so as to branch from said channel on an upstream side of said bypass and to join said channel on a downstream side of said bypass after bypassing outside said installation surface.

Other objectives, other features and accompanying advantages of the present invention will be easily understood from the following explanation about respective embodiments of the present invention described referring to drawings.

DETAILED DESCRIPTION

Technical Problem

Figure 1:
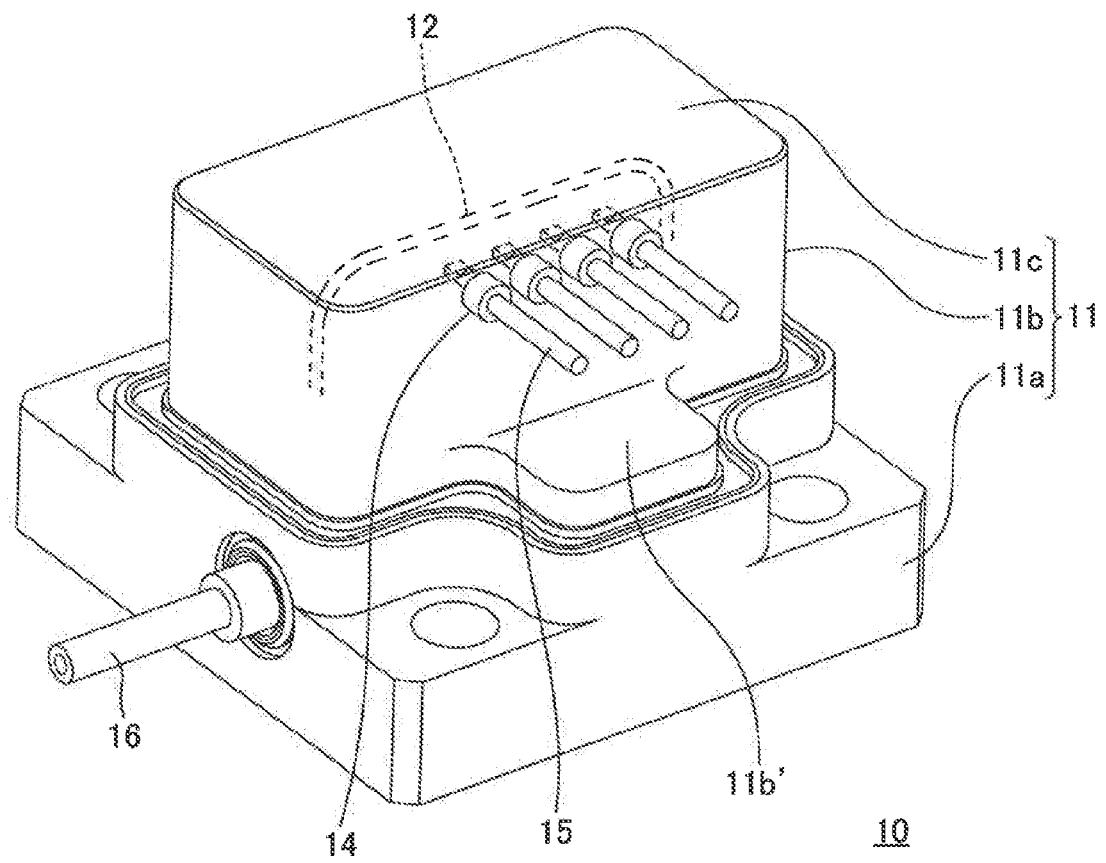
FIG. 1 is a perspective view of a thermal mass flow sensor according to a first embodiment of the present invention (first sensor).

In accordance with any of the above-mentioned conventional technologies, disappearance of a coating layer on sensor wires in association with use at a high temperature can be suppressed by enclosing a thermal mass flow sensor under an inert atmosphere (namely, under a vacuum or an inert gas atmosphere) in a sealed container.

However, in techniques described in the Patent Documents 1 and 2, it is necessary to weld the opening of a metal container in an inert gas atmosphere to seal a flow sensor inside the container in a glove box equipped with a vacuum pumping unit, etc., for example. Therefore, there is a problem that workability of a welding operation is remarkably bad and precision and/or efficiency of the welding operation is remarkably low.

In a technique described in the Patent Document 3, there is no need to assemble a package in a glove box, etc., as mentioned above. However, it is necessary to heat the encapsulant and make it melt to seal the sealing hole in a glove box, etc., too, and working efficiency is bad. In addition, since solder-based material having a comparatively low melting point, etc. is used as the encapsulant, there is a possibility that the encapsulant may be molten and hermetic seal of the package may be broken depending on an operating temperature of the flow sensor. When encapsulant having a higher melting point is used as a countermeasure for such a problem, a temperature for making the encapsulant melt also becomes higher and there is a possibility that a flow sensor may be damaged when airtightly sealing the package.

Solution to Problem

As mentioned above, in the art, in a thermal mass flow sensor enclosed in a sealed container under an inert atmosphere for the purpose of suppressing disappearance of a coating layer on sensor wires in association with use at a high temperature, a demand for a technology which can easily and accurately assemble the above-mentioned sealed container and can suppress degradation of airtightness of the above-mentioned sealed container in association with the use at a high temperature exists. In addition, in the present specification, an "airtight" refers to a "state where a plurality of members are joined without any gap and fluid cannot leak out from between these members," etc., for example. Moreover, as specific examples of such joining techniques which can join a plurality of members airtightly in this way, welding, brazing and diffusion bonding, etc. can be mentioned.

Embodiments of the present invention have been conceived in view of the above-mentioned problem, and one objective thereof is to provide a technology which can easily and accurately assemble a sealed container and can suppress degradation of airtightness of the above-mentioned sealed container in association with the use at a high temperature, in a thermal mass flow sensor enclosed in the above-mentioned sealed container under an inert atmosphere for the purpose of suppressing disappearance of a coating layer on sensor wires in association with use at a high temperature.

Namely, a thermal mass flow sensor according to an embodiment of the present invention (which may be referred to as a "present invention sensor" hereafter) is a thermal mass flow sensor enclosed in a sealed container under an inert atmosphere for the purpose of suppressing disappearance of a coating layer on sensor wires in association with use at a high temperature. Specifically, the present invention sensor comprises a sealed container, a sensor tube which communicates airtightly with an inlet and an outlet formed in an outer wall defining an internal space of the sealed container and is housed in the internal space of the sealed container, a pair of sensor wires wound around the sensor tube, a coating layer covering at least a part of the sensor wires, which are wound around the sensor tube, and a hermetic connector which is disposed on the outer wall and electrically connects both ends of each of the pair of the sensor wires with external electrodes disposed outside the sealed container. Moreover, the internal space of the sealed container is sealed so as to be an inert atmosphere, Furthermore, the present invention sensor further comprises an air release pipe that is a pipe which brings the internal space and outside of the sealed container in airtight communication with each other through an air release hole that is a through-hole formed in the outer wall. In addition, in the present invention sensor, an end of the air release pipe on an opposite side to the air release hole is sealed by plastic deformation to form a sealed part.

In addition, in the present invention sensor according to one embodiment, the sealed part may be further sealed by welding. The present invention sensor according to another preferable embodiment may further comprise a cap having an opening and an internal space, in which the sealed part can be housed, and the cap and the air release pipe may be further sealed by welding in a state where the sealed part is inserted in the internal space of the cap through the opening.

The present invention sensor which has a configuration as mentioned above can be manufactured in accordance with a production method of a thermal mass flow sensor according to the present invention (which may be referred to as the "present invention method" hereafter) including a first step to a fifth step as shown below.

First Step

The sensor tube, around which the pair of the sensor wires is wound, is welded to a first member that is a member in which the inlet and the outlet are formed, among a plurality of members constituting the sealed container, such that the inlet and the outlet are in airtight communication with both ends of the sensor tube.

Second Step

Both ends of each of the pair of the sensor wires are electrically connected to corresponding terminals of the hermetic connector, respectively, in a second member that is a member in which the hermetic connector is disposed, among the plurality of the members constituting the sealed container.

Third Step

The air release pipe is welded to a third member that is a member in which the air release hole is formed, among the plurality of the members constituting the sealed container, such that the air release pipe is in airtight communication with the internal space of the sealed container through the air release hole.

Fourth Step

The plurality of the members constituting the sealed container is welded with one another to form the sealed container.

Fifth Step

An end of the air release pipe on an opposite side to the air release hole is sealed by plastic deformation to form the sealed part, after discharging air from the internal space through the air release pipe (by a pressure reducing pump, etc., for example).

In addition, in the fifth step of the present invention method according to one preferable embodiment, the end of the air release pipe on an opposite side to the air release hole may be sealed by plastic deformation to form the sealed part, after enclosing inert gas in the internal space through the air release pipe after discharging air from the internal space through the air release pipe, by a pressure reducing pump, etc., for example. In this case, the inert gas may be enclosed into the internal space through the air release pipe, after moisture content in the inert gas has been lowered by a moisture reducing means which reduces moisture contained in the inert gas.

In the fifth step of the present invention method according to another preferable embodiment, the sealed part may be further sealed by welding after forming the sealed part. In the fifth step of the present invention method according to still another preferable embodiment, a cap having an opening and an internal space, in which the sealed part can be housed, and the air release pipe may be further sealed by welding in a state where the sealed part is inserted in the internal space of the cap through the opening after forming the sealed part.

In addition, the present invention method may further includes an airtightness testing step where a position, to which specific gas for detection is being supplied when the specific gas for detection is detected in gas being discharged from the internal space through the air release pipe (by a pressure reducing pump, etc., for example), is determined as a fault position, at which airtightness is insufficient, while locally supplying the specific gas for detection to an outer surface of the sealed container, before performing the fifth step.

Furthermore, in the present invention method according to another preferable embodiment, the fifth step may be performed at a temperature higher than a room temperature. In this case, the fifth step may be performed at a temperature higher than a room temperature and not higher than 200° C.

The present invention also relates to a thermal mass flow meter using the present invention sensor having a configuration as mentioned above (which may be referred to as the "present invention flow meter" hereafter). The present invention flow meter may further comprise a heat conductive block in surface contact with an installation surface of a base and a side surface of the sealed container of the present invention sensor, respectively. The present invention flow meter may further comprise a temperature adjusting block which is disposed so as to be in contact with a side surface of at least either one of the base and the heat conductive block. In this case, the temperature adjusting block is formed of heat conductive material, and has a heating element which heats the temperature adjusting block and/or a cooling element which cools the temperature adjusting block.

In a case of the above, the air release hole may be arranged at a position symmetrical with respect to the pair of the sensor wires in a heat conduction path in the thermal mass flow sensor. Moreover, a through-hole, through which the air release pipe is inserted, may be formed in the heat conductive block, and the shortest distance between an outside surface of the air release pipe and an inside surface of the through-hole may be 1 millimeter or more. Furthermore, heat insulating material may be filled between the outside surface of the air release pipe and the inside surface of the through-hole.

Advantageous Effects of Invention

In accordance with the above-mentioned present invention sensor, the present invention method and the present invention flow meter, in a thermal mass flow sensor enclosed in a sealed container under an inert atmosphere for the purpose of suppressing disappearance of a coating layer on sensor wires in association with use at a high temperature, the above-mentioned sealed container can be easily and accurately assembled and degradation of airtightness of the above-mentioned sealed container in association with the use at a high temperature can be suppressed. Therefore, aging variation (change with time) due to deterioration of the coating layer on the sensor wires in association with the use of the thermal mass flow sensor can be suppressed, without causing increase of a manufacturing cost and/or a degradation of processing accuracy of the sealed container.

Moreover, in accordance with the present invention sensor, the present invention method and the present invention flow meter, problems such as the deterioration of the coating layer on the sensor wires and a change of sensitivity of the present invention sensor in association with the use of the present invention sensor, for example, can be reduced.

In accordance with the present invention flow meter which further has the heat conductive block and/or the temperature adjusting block, a temperature of the present invention sensor can be maintained at a desired temperature regardless of an environmental temperature around the present invention flow meter to reduce problems such as condensation and deterioration of gas in the inside of the sensor tube, for example. In addition, in accordance with the present invention flow meter, by reducing heat conduction between the air release pipe and the heat conductive block and/or temperature adjusting block, problems such as effect of a transitional temperature change of the temperature adjusting block in association with switching between an operating state and a stopped state of the heating element and/or the cooling element which the temperature adjusting block comprises on a detection result of a mass flow rate can be reduced.

First Embodiment

Hereafter, a thermal mass flow sensor according to a first embodiment of the present invention (which may be referred to as a "first sensor" hereafter) will be explained, referring to drawings.

Configuration

As shown in FIG. 1 to FIG. 4, the first sensor 10 has the same configuration as a common thermal mass flow sensor in a point that the first sensor 10 comprises a sensor tube 12, a pair of sensor wires 13 (13a and 13b, illustrated only in FIG. 3) wound around the sensor tube 12, and a coating layer (not shown) covering at least a part of the sensor wires 13, which are wound around the sensor tube 12.

The sensor tube 12 is a tubular member formed of material which is inactive to fluid to be measured (for example, process gas supplied into a chamber in a manufacturing process of a semiconductor), which flows through the sensor tube 12, and can tolerate measurement conditions (for example, temperature and pressure, etc.) for mass flow rate of the fluid to be measured. In the present example, a steel pipe made of stainless steel (for example, SUS316 material in accordance with Japanese Industrial Standards, etc.) which has an outside diameter of 0.6 millimeters and a thickness of 0.04 millimeters is used as the sensor tube 12.

The sensor wires 13 are linear members formed of conductive material that can function as a heater element which can generate heat by energization and heat the fluid to be measured, which flows through the sensor tube 12, and as a resistive element whose electrical resistivity changes according to temperature. In the present example, a wire made of iron nickel alloy (30% of iron and 70% of nickel) which has a diameter of 35 micrometers is used as the sensor wires 13.

As mentioned above, for the material which constitutes the coating layer, a function as an electric insulator, a function as an adhesive, and a function as a conductor of heat are required. Furthermore, a coating layer which can be thinly formed on the surface of the sensor wires 13 and has flexibility such that a crack may not be generated even when the sensor wires 13 after the coating layer is formed thereon are wound around the sensor tube is preferable. From these viewpoints, organic material such as resin which has excellent heat resistance, such as polyamideimide and polyimide, for example, is used.

In the present example, a coating layer consisting of polyimide with a film thickness of 6.0 micrometers is formed by applying N-methyl pyrrolidone solution of polyimide acid, which is a polyimide precursor, (which may be referred to as a "solution A" hereafter) to the surface of the sensor wires 13, drying the same, and thereafter baking them. In addition, a coating layer may be prepared also on the surface of the sensor tube 12 for the purpose of making more reliable insulation and adhesion between the sensor tube 12 and the sensor wires 13, etc., for example. In this case, for example, a coating layer consisting of polyimide can be formed also on the surface of the sensor tube 12 by applying the above-mentioned solution A over a predetermined length on the surface of the sensor tube 12, drying the same, and thereafter baking them.

The sensor tube 12, the sensor wires 13 and the coating layer are housed in an internal space of a sealed container 11 sealed so as to be an inert atmosphere for the purpose of suppressing disappearance of the coating layer in association with use at a high temperature. In the present example, the sealed container 11 is constituted by constitutional members 11a, 11b and 11c. As material for constituting the constitutional members 11a, 11b and 11c, material which can be airtightly joined with one another by welding, etc., for example, to constitute the sealed container 11 and tolerate the measurement conditions (for example, temperature and pressure, etc.) of a mass flow rate of the fluid to be measured is chosen. In the present example, a sensor base made of stainless steel (for example, SUS316L material in accordance with Japanese Industrial Standards, etc.), a sensor case made of 42 alloy and a lid made of 42 alloy are adopted as the constitutional members 11a and 11b, respectively, and the sealed container 11 is constituted by joining these by welding.

The "inert atmosphere" refers to an atmosphere in which the coating layer is not degraded. Specifically, the "inert atmosphere" refers to a state where oxidized gas such as oxygen does not exist in the internal space of the sealed container 11 at all or exists only slightly, a state where the internal space of the sealed container 11 is filled with inert gas such as rare gases, and a vacuum state (including an extremely low pressure state), etc.

Figure 2:
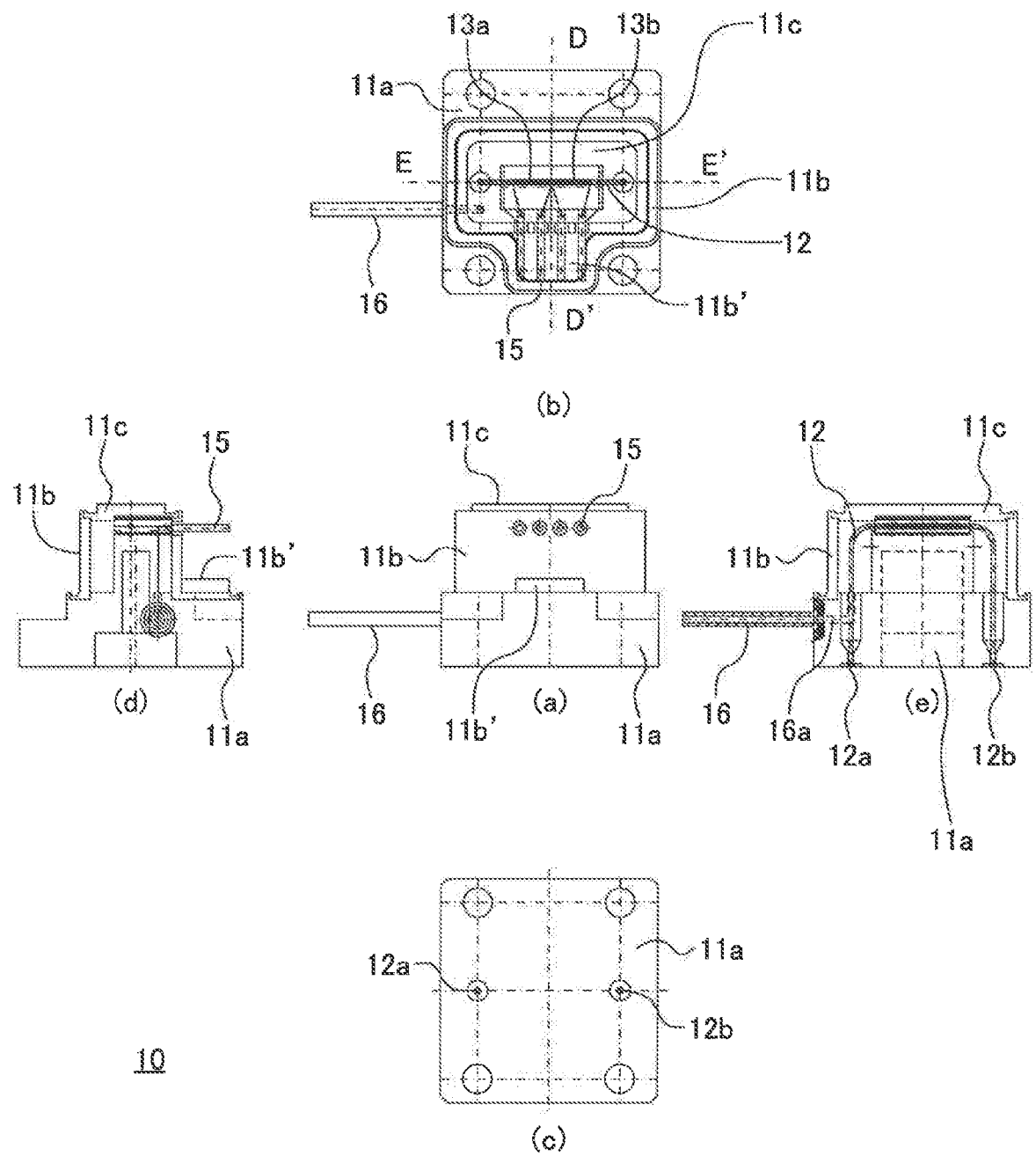
FIG. 2 is (a) a front view, (b) a top view (perspective projection), (c) a bottom view, (d) a sectional view along a plane D-D' observed from the left side, and (e) a sectional view along a plane E-E' observed from the front, of the first sensor.
Figure 3:
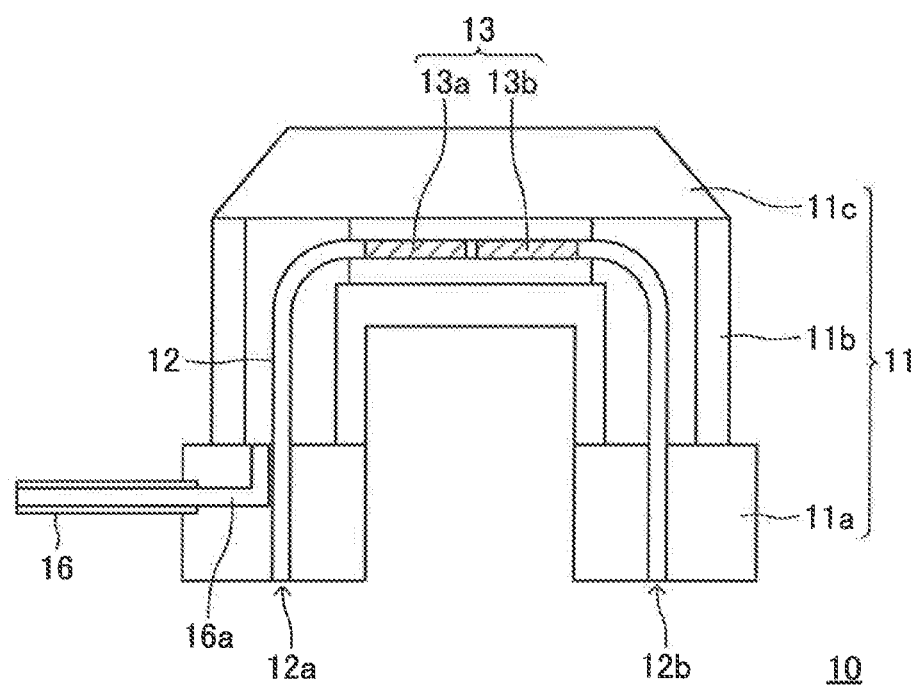
FIG. 3 is a schematic enlarged view of (e) in FIG. 2.

The sensor tube 12 is in airtight communication with an inlet 12a and an outlet 12b formed in an outer wall defining the internal space of the sealed container 11. The inlet 12a and the outlet 12b may be formed in any of the constitutional members 11a, 11b and 11c. Namely, the inlet 12a and the outlet 12b may be formed in any of the sensor base, the sensor case and the lid. Typically, the inlet 12a and the outlet 12b are formed in the sensor base. In the present example, as shown in FIG. 2 and FIG. 3, the openings on the side of the bottom surface (outside of the sealed container 11) of two through-holes formed in the constitutional member 11a that is a sensor base made of stainless steel correspond to the inlet 12a and the outlet 12b, respectively.

On the other hand, since the sensor tube 12 consists of steel pipe made of stainless steel as mentioned above, the sensor tube 12, the inlet 12a and the outlet 12b are respectively joined by welding, in the present example.

In addition, when the first sensor 10 is incorporated as a component of a mass flow meter, the inlet 12a and the outlet 12b are respectively connected to the upstream side and the downstream side of a bypass (not shown) prepared in a channel (not shown) for the fluid to be measured such that the upstream side and the downstream side of the bypass in the channel for the fluid to be measured are in communication with each other through the sensor tube 12.

Furthermore, the first sensor 10 comprises a hermetic connector 14 which is disposed on the outer wall defining the internal space of the sealed container 11 and electrically connects both ends of each of the pair of the sensor wires 13a and 13b with external electrodes 15 disposed outside the sealed container 11. Thereby, it is possible to energize each of the pair of the sensor wires 13a and 13b through the external electrode 15 from a power source (not shown) prepared outside the sealed container 11. As a result, when the first sensor 10 is incorporated as a component of a mass flow meter, a predetermined electric current can be flown through the sensor wires 13 to generate heat, and a mass flow rate of the fluid to be measured (for example, process gas supplied into a chamber in a manufacturing process of a semiconductor) flowing through the inside of the sensor tube 12 can be measured as mentioned above. Moreover, a sensor circuit including a bridge circuit constituted by the pair of the sensor wires 13a and 13b and other resistive elements can be constituted and thereby a mass flow rate of the fluid to be measured, which flows through the sensor tube 12, can be measured as and mentioned above.

The hermetic connector 14 may be formed in any of the constitutional members 11a, 11b and 11c. Namely, the hermetic connector 14 may be formed in any of the sensor base, the sensor case and the lid. In the present example, as shown in FIG. 1 and FIG. 2, the hermetic connector 14 is formed in the constitutional member 11b that is a sensor case made of 42 alloy. Since the detailed configuration of the hermetic connector 14 is well known to a person skilled in the art, explanation thereof is omitted here. In addition, in the present example, Kovar (registered trademark) (made by Westinghouse, iron-nickel-cobalt alloy) plated with gold is used as material which constitutes the external electrodes 15.

In addition to the above, the first sensor 10 further comprises an air release pipe 16 that is a pipe which brings the internal space and outside of the sealed container 11 in airtight communication with each other through an air release hole 16a that is a through-hole formed in the outer wall defining the internal space of the sealed container 11. The air release hole 16a may be formed in any of the constitutional members 11a, 11b and 11c. Namely, the air release hole 16a may be formed in any of the sensor base, the sensor case and the lid. In the present example, as shown in FIG. 2 and FIG. 3, the air release hole 16a is formed in the constitutional member 11a that is a sensor base made of stainless steel.

The air release pipe 16 is a tubular member formed of material which can tolerate not only of measurement conditions (for example, temperature and pressure, etc.) of a mass flow rate of the fluid to be measured, but also a pressure difference between the inside and outside of the pipe when discharging air from the internal space of the sealed container 11 as will be mentioned later in detail. In the present example, a steel pipe made of stainless steel (for example, SUS316L material of Japanese Industrial Standards, etc.) which has an outside diameter of 2.0 millimeters and a thickness of 0.5 millimeters is used as the air release pipe 16.

Figure 4:
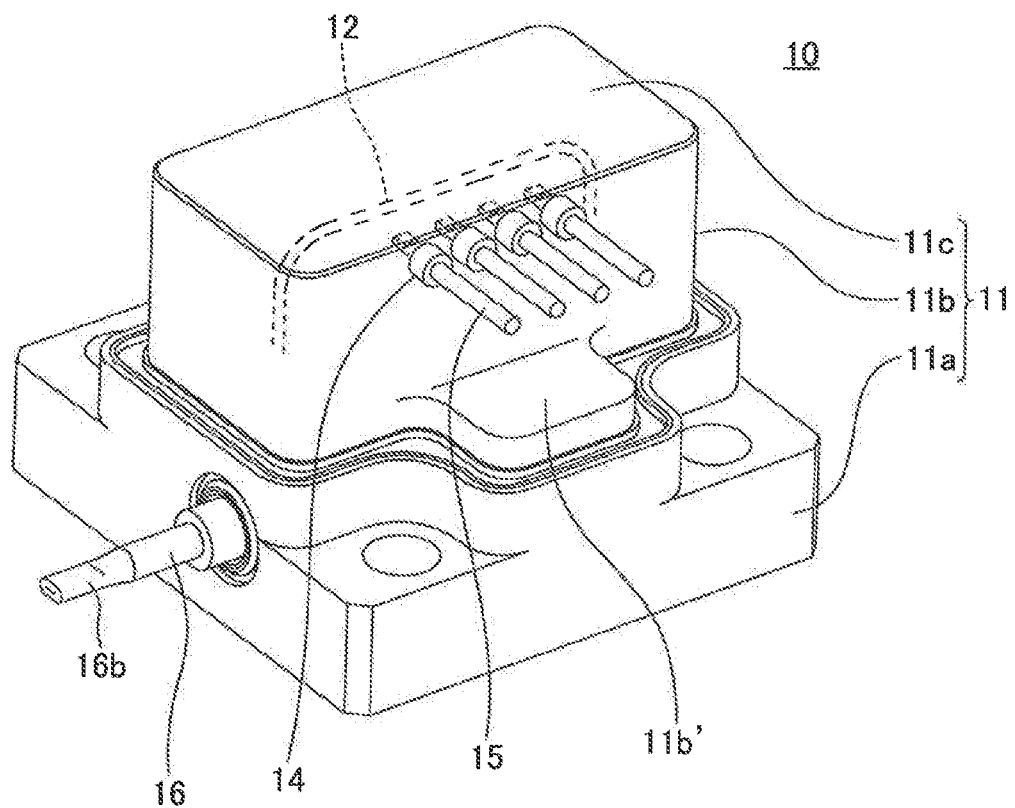
FIG. 4 is a schematic perspective view for showing that an end of an air release pipe 16, which the first sensor comprises, on an opposite side to an air release hole 16a is sealed by plastic deformation to form a sealed part 16b.

Furthermore, for example, as shown in FIG. 4, an end of the air release pipe 16 on an opposite side to the air release hole 16a is sealed by plastic deformation to form a sealed part 16b. Thereby, the internal space of the air release pipe 16 in the sealed part 16b is closed (blocked), and the internal space of the sealed container 11 is insulated from the outside. Namely, the sealed container 11 is closed airtightly. In addition, in FIG. 4, the sealed part 16b is formed by crushing the air release pipe 16, the internal space of the air release pipe 16 is closed, and the internal space of the sealed container 11 is insulated from the outside. However, specific techniques for causing plastic deformation of the air release pipe 16 to form the sealed part 16b are not limited to the above.

As specific examples of the above-mentioned "plastic deformation", crushing, bending, cutting and twisting off (wrenching off), etc. can be mentioned, for example. Therefore, the air release pipe 16 is formed of material, for which plastic deformation is possible. Typically, the air release pipe 16 is formed of metal including iron-based metal, such as stainless steel as mentioned above, for example.

Moreover, it is desirable that material which forms the air release pipe 16 has a property which neither needs an excessive load nor produces unintended breakage when being sealed by plastic deformation to form the sealed part 16b. From such a viewpoint, the material which forms the air release pipe 16 has a hardness smaller than a predetermined hardness. Specifically, the material which forms the air release pipe 16 has a Vickers hardness of 180 or less, more preferably 150 or less. Such an air release pipe 16 can be obtained by annealing a steel pipe, which is made of stainless steel and has a desired shape and size, at a predetermined temperature, for example.

In addition, in the first sensor 10, as mentioned above, the sealed container 11 is constituted by the three constitutional members 11a, 11b and 11c. However, as long as a configuration which can realize a function as a thermal mass flow sensor can be attained, the number of the constitutional members and the shapes of the respective constitutional members of the sealed container 11 are not limited to the above. Namely, the number of the constitutional members and the shapes of the respective constitutional members, which form the sealed container 11, can be variously changed according to an intended configuration of the sensor.

Moreover, in the first sensor 10, as mentioned above, the inlet 12a, the outlet 12b and the air release hole 16a are formed in the constitutional member 11a, and the hermetic connector 14 is formed in the constitutional member 11b. However, as long as a configuration which can realize a function as a thermal mass flow sensor can be attained, the arrangement of the inlet 12a and the outlet 12b, the air release hole 16a, and the hermetic connector 14 is not limited to the above. Namely, all of the inlet 12a and the outlet 12b, the air release hole 16a, and the hermetic connector 14 may be formed in one constitutional member, or each of them is may be formed in a different constitutional member.

Effectiveness

In the first sensor 10, the sensor tube 12, around which the sensor wires 13 covered with the coating layer are wound, is enclosed in the sealed container 11 under an inert atmosphere. Therefore, disappearance of the coating layer on the sensor wires 13 in association with use at a high temperature can be suppressed. Furthermore, in accordance with the first sensor 10 having the configuration as mentioned above, the sealed container 11 can be assembled by welding the constitutional members 11a to 11c under a usual air atmosphere, other than under a special environment such as in a glove box, for example. Therefore, the sealed container 11 can be assembled easily and accurately.

In addition, eventually, the internal space of the sealed container 11 assembled in this way is airtightly closed by sealing the air release pipe 16 in communication with the air release hole 16a by plastic deformation. Therefore, the sealed container 11 can be airtightly closed under a usual air atmosphere, other than under a special environment such as in a glove box, for example. Furthermore, unlike seal by heating encapsulant consisting of solder-based material, for example, to make the encapsulant melt, degradation of airtightness of the sealed container 11 in association with use at a high temperature can be suppressed.

As mentioned above, in accordance with the first sensor 10, aging variation due to deterioration of the coating layer on the sensor wires in association with the use of the thermal mass flow sensor can be suppressed, without causing increase of a manufacturing cost and/or degradation of processing accuracy of the sealed container.

Modification 1 of First Embodiment

As mentioned above, in the first sensor 10, the internal space of the sealed container 11 under an inert atmosphere is airtightly closed by the end of the air release pipe 16 on the opposite side to the air release hole 16a being sealed by plastic deformation to form the sealed part 16b. However, in some cases, the airtightness of the sealed container 11 attained by sealing the air release pipe 16 only by plastic deformation may be insufficient.

For example, when the inert atmosphere is attained by a vacuum state, more advanced airtightness is required for the sealed container 11. Moreover, for example, also in a case where the internal space of the sealed container 11 is filled with inert gas and the first sensor 10 needs to be heated up to a remarkably high temperature when measuring a flow rate, more advanced airtightness is required.

When the airtightness of the sealed container 11 needs to be improved further as mentioned above, the above-mentioned sealed part 16b may be further sealed by welding. In this case, the air release pipe 16 is formed of material which can be welded. Typically, the air release pipe 16 is formed of metal including iron-based metal, such as stainless steel as mentioned above, for example.

In accordance with the above, the internal space of the sealed container 11 is closed further airtightly by welding the sealed part 16b, in addition to seal by plastic deformation of the air release pipe 16. As a result, the airtightness of the sealed container 11 can be improved further.

Modification 2 of First Embodiment

However, when further sealing the sealed part 16b of the air release pipe 16 sealed by plastic deformation by welding as mentioned above, the shape of the sealed part 16b may be at least partially returned to a state before being sealed by plastic deformation, due to residual stress of the plastic deformation, by temperature rising in association with the welding, and the seal in the sealed part 16b may be broken. Moreover, in a case where the sealed part 16b is not welded, there is a possibility that the same problem may occur when the first sensor 10 is heated up to a remarkably high temperature at the time of measurement of a flow rate, for example. Namely, there is concern over degradation of airtightness of the sealed part 16b due to a shape change of the sealed part 16b by temperature rising when measuring a flow rate and welding, etc., for example.

Figure 5:
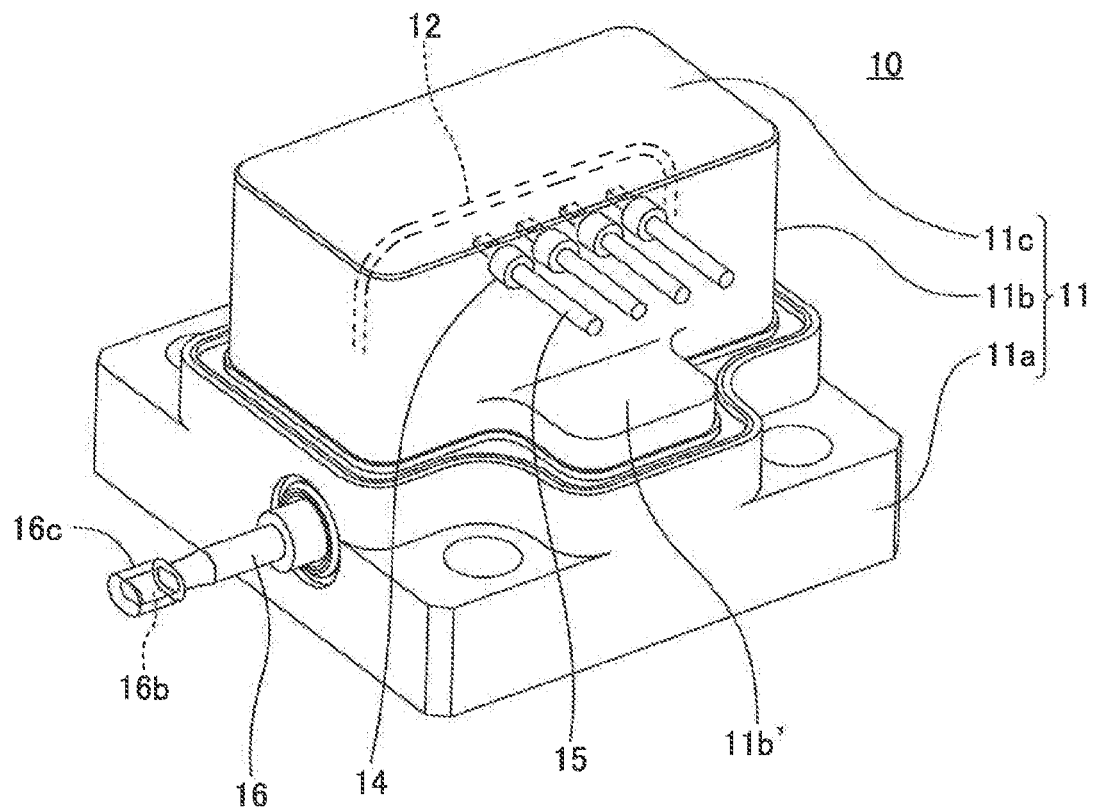
FIG. 5 is a schematic perspective view for showing that an end of an air release pipe 16, which the first sensor according to the modification 2 of the first embodiment of the present invention comprises, on an opposite side to an air release hole 16a forms a sealed part 16b, and a cap 16c and the air release pipe 16 are further sealed by welding in a state where the sealed part 16b is inserted in an internal space of the cap 16c.

When there is concern as the above, for example, as shown in FIG. 5, the first sensor 10 may further comprises a cap having an opening and an internal space, in which the sealed part 16b can be housed, and the cap 16c and the air release pipe 16 may be further sealed by welding in a state where the sealed part 16b is inserted in the internal space of the cap 16c through the opening.

In this case, the cap 16c is formed of material which can be welded. Typically, the cap 16c is formed of metal including iron-based metal, such as stainless steel (for example, SUS316L material of Japanese Industrial Standards, etc.), for example. Moreover, from a viewpoint of preventing the degradation of airtightness due to a shape change of the sealed part 16b by temperature rising, it is desirable that the cap 16c and the air release pipe 16 are welded at a position apart from the sealed part 16b. Typically, a periphery of the opening of the cap 16c and a lateral surface of the air release pipe 16 in the vicinity of the periphery of the opening of the cap 16c are welded.

In accordance with the above, the cap 16c including (housing) the sealed part 16b of the air release pipe 16, which has been sealed by plastic deformation, is further sealed by being welded to the air release pipe 16. Thus, since the sealed part 16b itself is not welded, the degradation of airtightness due to a shape change of the sealed part 16b by temperature rising in association with welding can be prevented. Furthermore, the degradation of airtightness as the whole sealed container 11 can be prevented even when the shape of the sealed part 16b changes by temperature rising in association with measurement of a flow rate at a high temperature and thereby the seal in the sealed part 16b is broken, since being further sealed by welding the cap 16c and the air release pipe 16 as mentioned above.

Second Embodiment

Hereafter, a production method of a thermal mass flow sensor according to a second embodiment of the present invention (which may be referred to as a "first method" hereafter) will be explained referring to drawings.

A thermal mass flow sensor manufactured by the first method is a thermal mass flow sensor according to the present invention including the above-mentioned first sensor 10. Therefore, since the configuration of the thermal mass flow sensor manufactured by the first method has been already mentioned in the explanation about the thermal mass flow sensor according to the present invention, the explanation will not be repeated here.

The first method includes the first step to the fifth step, as mentioned above. Each of the first to fifth steps will be explained in detail below. However, it is needless to say that the production method of a thermal mass flow sensor according to the present invention can further include a step other than the first step to the fifth step according to configurations of the thermal mass flow sensor to be manufactured and specifications of a production equipment by which the production method is performed, etc., for example.

In addition, for the purpose of easy understanding, in the following explanation, a case where the above-mentioned first sensor 10 is manufactured in accordance with the first method by sequentially executing the first step to the fifth step as shown in a flowchart of FIG. 6 will be supposed. Therefore, the same reference signs as those in the above-mentioned explanation about the first sensor 10 will be attached to respective components of the first sensor 10 in the following explanation.

First Step

First, in step S01, the sensor tube 12, around which the pair of the sensor wires 13 (13a and 13b) is wound, is welded to a first member that is a member in which the inlet 12a and the outlet 12b are formed, among a plurality of members constituting the sealed container 11, such that the inlet 12a and the outlet 12b are in airtight communication with both ends of the sensor tube 12.

In the first sensor 10, as mentioned above, the inlet 12a and the outlet 12b are formed in the constitutional member 11a. Therefore, in the first sensor 10, the constitutional member 11a corresponds to the first member.

Second Step

Next, in step S02, both ends of each (13a and 13b) of the pair of the sensor wires 13 are electrically connected to corresponding terminals (not shown) of the hermetic connector 14, respectively, in a second member that is a member in which the hermetic connector 14 is disposed, among the plurality of the members constituting the sealed container 11.

In the first sensor 10, as mentioned above, the hermetic connector 14 is formed in the constitutional member 11*b*. Therefore, in the first sensor 10, the constitutional member 11*b* corresponds to the second member. Moreover, as mentioned above, it is necessary to electrically connect the both ends of each of the pair of the sensor wires 13 wound around the sensor tube 12 welded to the first member (constitutional member 11*a*) with the terminals of the hermetic connector 14 disposed inside the second member (constitutional member 11*b*). In order to make this operation easy, an opening is formed on an upper side (side which is opposite to a side opposing (facing) the constitutional member 11*a*) of the constitutional member 11*b* (the upper side is opened). In addition, as will be mentioned later in detail, this opening is closed with the constitutional member 11*c* and thereby the sealed container 11 is formed.

Specific techniques for connecting the both ends of each of the pair of the sensor wires 13 to the corresponding terminals of the hermetic connector 14 are not limited in particular, as long as the connection can tolerate the manufacturing conditions of the first sensor 10 and the measurement conditions (for example, temperature and pressure, etc.) of a mass flow rate of fluid to be measured. In the first method, the both ends of the sensor wires 13 are connected to the corresponding terminals of the hermetic connector 14 by welding.

Third Step

Furthermore, in step S03, the air release pipe 16 is welded to a third member that is a member in which the air release hole 16*a* is formed, among the plurality of the members constituting the sealed container 11, such that the air release pipe 16 is in airtight communication with the internal space of the sealed container 11 through the air release hole 16*a*.

In the first sensor 10, as mentioned above, the air release hole 16*a* is formed in the constitutional member 11*a*. Therefore, in the first sensor 10, the constitutional member 11*a* corresponds to the third member. Namely, in the first sensor 10, the constitutional member 11*a* corresponds to both the first member and the third member.

However, the first member to the third member may be any of the plurality of the constitutional members which constitute the sealed container 11. For example, one constitutional member among the plurality of the members constituting the sealed container 11 may correspond to all the first to third members, or the first member to the third member may correspond respectively to different constitutional members among the plurality of the members constituting the sealed container 11.

Fourth Step

Next, in step S04, the plurality of the members constituting the sealed container 11 are welded with one another to form the sealed container 11. Namely, in the fourth step, the plurality of the members including the above-mentioned first member, the second member and the third member are welded with one another to form the sealed container 11. In the present example, the sealed container 11 is formed by welding the constitutional member 11*c* that is the lid made of 42 alloy, in addition to the constitutional member 11*a* that is the sensor base made of stainless steel and the constitutional member 11*b* that is the sensor case made of 42 alloy.

Specific techniques for welding the respective constitutional members to form the sealed container 11 as mentioned above are not limited in particular, and welding method such as the above-mentioned resistance welding method or laser welding method can be adopted, for example. By the way, in the present example, as shown in FIG. 1 and (b) of FIG. 2, a part of a portion (bonding portion) opposing the constitutional member 11*a* (sensor base) of the constitutional member 11*b* (sensor case) protrudes. Specifically, a protrusion 11*b*' is formed in a part of the above-mentioned bonding portion such that an outline of the above-mentioned bonding portion includes a region, in which the external electrodes 15 prepared in the outside of the constitutional member 11*b* exists, in a projection to a bonding plane between the constitutional member 11*a* and the constitutional member 11*b*.

This is because the laser welding method is adopted in the present example as a specific technique for welding respective constitutional members to form the sealed container 11. In this laser welding method, a laser beam is irradiated to the bonding portion from an upper side in FIG. 1 (namely, side of the constitutional member 11*b*). Therefore, if the protrusion 11*b*' as mentioned above was not formed, there is a possibility that the laser beam which should be irradiated to the bonding portion may be interfered by the external electrodes 15 to make it difficult to sufficiently bond the constitutional member 11*a* and the constitutional member 11*b* or damage the external electrodes 15.

Any of the steps so far can be performed under a usual air atmosphere, and does not need a special environment, such as in a glove box. Therefore, various processing carried out in the above-mentioned first to fourth steps can be performed easily and accurately. At this stage, the internal space and outside of the sealed container 11 are still in communication with each other through the air release hole 16*a* and the air release pipe 16 formed in the third member (constitutional member 11*a*), and the internal space of the sealed container 11 is still in an air atmosphere (not in an inert atmosphere).

Fifth Step

Then, in step S05, an end of the air release pipe 16 on an opposite side to the air release hole 16*a* is sealed by plastic deformation to form the sealed part 16*b*, after discharging air (atmospheric air) from the internal space of the sealed container 11 through the air release pipe 16 by a pressure reducing pump, etc. (not shown).

As mentioned above, as specific examples of the above-mentioned "plastic deformation", crushing, bending, cutting and twisting off (wrenching off), etc. can be mentioned, for example. Moreover, such plastic deformation of the air release pipe 16 can be caused using a tool, such as pinchers, cutting nippers and cutting pliers, and a processing machinery such as a pressing machine, for example. Furthermore, the above-mentioned sealed part 16*b* does not necessarily have to be located at an end of the air release pipe 16 on an opposite side to the air release hole 16*a* at a starting time point of the plastic deformation of the air release pipe 16. For example, an intermediate part between the both ends of the air release pipe 16 may be sealed by plastic deformation, and the sealed part 16*b* may be formed at the end of the air release pipe 16 of the opposite side to the air release hole 16*a* as a result of cutting the intermediate part.

Figure 6:
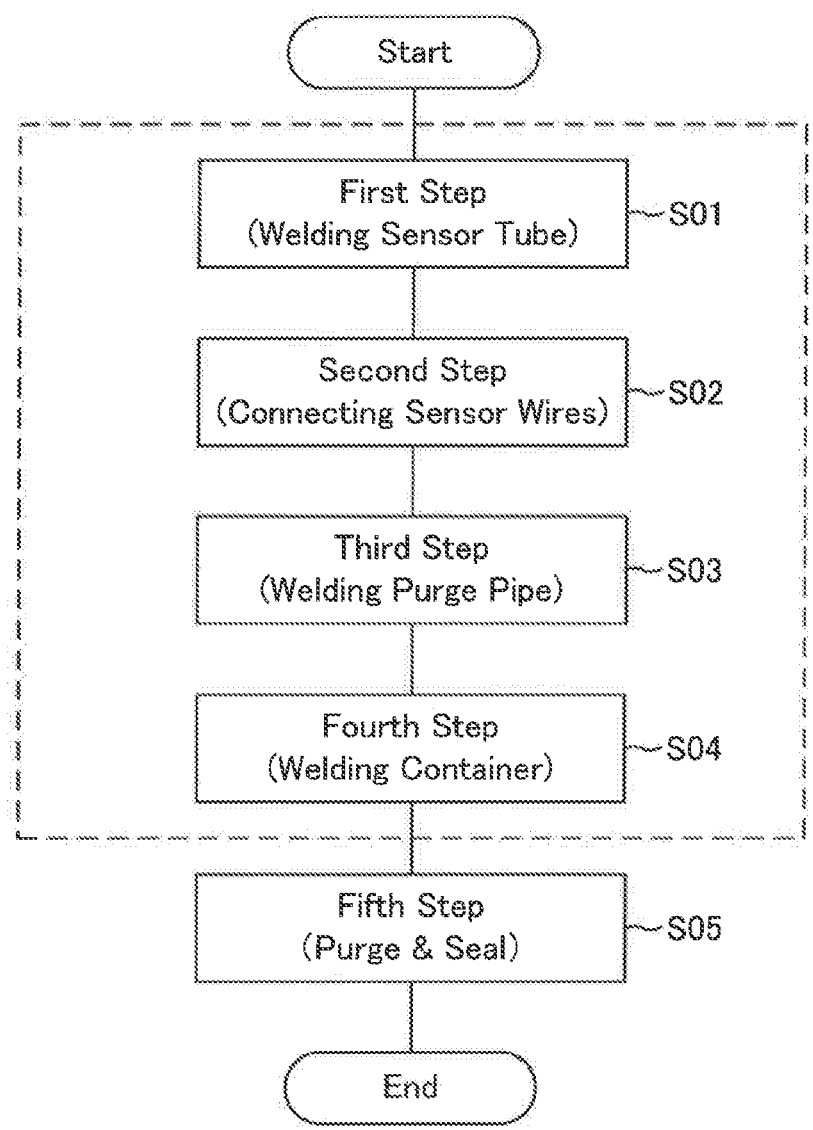
FIG. 6 is a flowchart for showing a flow of respective steps included in a production method of a thermal mass flow sensor according to a second embodiment of the present invention (first method).

In the above-mentioned explanation about the first method, a case where the first step to the fifth step are executed sequentially as shown in the flowchart of FIG. 6 was explained. However, execution sequence of the respective steps included in the production method of a thermal mass flow sensor according to the present invention is not limited to the flowchart of FIG. 6 and the above-mentioned explanation. Specifically, as long as the fifth step, in which the air release pipe 16 is sealed by plastic deformation to form the sealed part 16b, is performed after the internal space of the sealed container 11 has been in an airtightly closed state except for the air release hole 16a and the air release pipe 16 formed in the third member (constitutional member 11a), the execution sequence of the respective steps is not limited in particular. For example, as long as a thermal mass flow sensor which has an intended configuration can be obtain, the execution sequence of the steps S01 to S04 surrounded by a broken line in the flowchart of FIG. 6 is not limited in particular.

Effectiveness

As mentioned above, in accordance with the first method, the first sensor 10 which can suppress disappearance of the coating layer on the sensor wires 13 in association with use at a high temperature can be manufactured easily and accurately by hermetically (airtightly) enclosing the sensor tube 12, around which the sensor wires 13 covered with the coating layer are wound, in the sealed container 11 in an inert atmosphere (vacuum state in the present example). Specifically, in accordance with the first method, the sealed container 11 can be assembled by welding the constitutional members 11a to 11c under a usual air atmosphere, other than under a special environment such as in a glove box, etc., for example. Therefore, the sealed container 11 can be assembled easily and accurately.

In addition, eventually, the internal space of the sealed container 11 assembled as mentioned above is airtightly closed by sealing the air release pipe 16 in communication with the air release hole 16a by plastic deformation. Therefore, the sealed container 11 can be airtightly closed under a usual air atmosphere, other than under a special environment such as in a glove box, for example. Furthermore, unlike seal by heating encapsulant consisting of solder-based material, for example, to make the encapsulant melt, degradation of airtightness of the sealed container 11 in association with use at a high temperature can be suppressed.

As mentioned above, in accordance with the first method, aging variation due to deterioration of the coating layer on the sensor wires in association with the use of the thermal mass flow sensor can be suppressed, without causing increase of a manufacturing cost and/or degradation of processing accuracy of the sealed container.

Modification 1 of Second Embodiment

In the fifth step included in the above-mentioned first method, after discharging air (atmospheric air) from the internal space of the sealed container 11 through the air release pipe 16 by a pressure reducing pump, etc., the end of the air release pipe 16 on the opposite side to the air release hole 16a is sealed by plastic deformation to form the sealed part 16b. Thereby, the internal space of the sealed container 11 becomes a vacuum state as an inert atmosphere. However, when the internal space of the sealed container 11 is in a vacuum state, a pressure difference between the internal space and outside of the sealed container 11 is very large, and there is concern that air, etc., may enter into the internal space of the sealed container 11 from an ambient atmosphere during a subsequent period of use of the first sensor 10 and the internal space of the sealed container 11 may become no longer an inert atmosphere, depending on the airtightness of the sealed part 16b and the junction (bonding portion) between the constitutional members of the sealed container 11. In order to reduce such concern, it is desirable to form the sealed part 16b in a state where the internal space of the sealed container 11 is filled with inert gas, for example.

In such a case, in the above-mentioned fifth step, the end of the air release pipe 16 on the opposite side to the air release hole 16a may be sealed by plastic deformation to form the sealed part 16b, after enclosing inert gas in the internal space of the sealed container 11 through the air release pipe 16 after discharging air from the internal space of the sealed container 11 through the air release pipe 16 by a pressure reducing pump, etc.

In accordance with the above, the sealed part 16b is formed in a state where the internal space of the sealed container 11 is filled with inert gas. As a result, the pressure difference between the internal space and outside of the sealed container 11 can be made small. Therefore, the concern that air, etc., may enter into the internal space of the sealed container 11 from an ambient atmosphere during a subsequent period of use of the first sensor 10 and the internal space of the sealed container 11 may become no longer an inert atmosphere can be reduced.

By the way, when the inert gas, with which the internal space of the sealed container 11 is filled as mentioned above, contains moisture, there is a possibility that it may lead to problems such as deterioration of the coating layer on the sensor wires 13 (for example, due to hydrolysis, etc.) or change in sensitivity of the first sensor 10 in association with use of the first sensor 10. Therefore, in the fifth step, inert gas whose moisture content has been lowered by a moisture reducing means which reduces moisture contained in the inert gas may be enclosed into the internal space of the sealed container 11 through the air release pipe 16, after discharging air from the internal space through the air release pipe 16.

Figure 7:
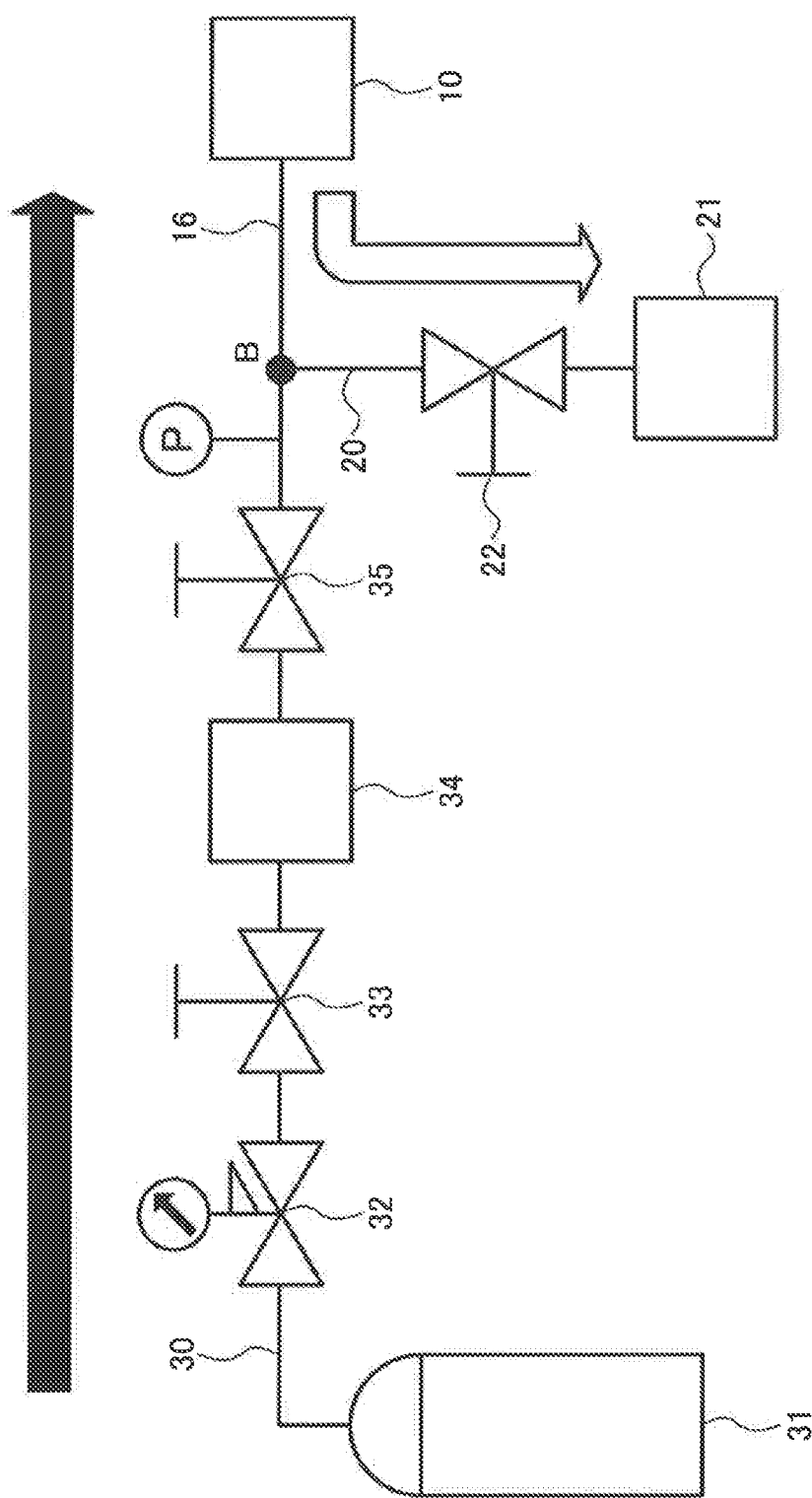
FIG. 7 is a schematic view for showing that, in the fifth step, inert gas whose moisture content has been lowered by a moisture reducing means which reduces moisture contained in the inert gas is enclosed into the internal space through the air release pipe, after discharging air from the internal space through the air release pipe.

Specifically, as shown in FIG. 7, a pipeline (piping system), in which an exhaust line 20 and an enclosing line 30 are connected to the air release pipe 16 of the first sensor 10 through a branch point B, is prepared, for example. A pressure reducing pump (vacuum pump) 21 is connected to an end of the exhaust line 20 on an opposite side to the branch point B, and an on-off valve 22 is interposed between the pressure reducing pump and the branch point B. On the other hand, an inert gas source 31 (for example, cylinder etc.) used as a source of inert gas (for example, nitrogen and argon, etc.) is connected to an end of the enclosing line 30 on an opposite side to the branch point B, and a regulator 32, an on-off valve 33, a moisture reducing means 34 and an on-off valve 35 are interposed in order from the inert gas source 31 toward the branch point B. In addition, as a specific example of the moisture reducing means 34, various kinds of filters, such as a chemical filter and a moisture removing filter, etc., which can remove or reduce moisture in inert gas by chemical adsorption or physical adsorption, can be mentioned, for example. Furthermore, a pressure gauge P is disposed on the enclosing line 30 between the on-off valve 35 and the branch point B.

In the pipeline which has the above-mentioned configuration, first, air is discharged from the internal space of the sealed container 11 (not shown) through the air release pipe 16 and the exhaust line 20 (refer to an outlined white arrow in FIG. 7) by operating the pressure reducing pump 21 in a state where the on-off valve 22 is opened and the on-off valve 35 is closed. Thereafter, the on-off valve 22 is closed and the on-off valve 33 and the on-off valve 35 are opened to enclose inert gas into the internal space of the sealed container 11 through the enclosing line 30 and the air release pipe 16 from the inert gas source 31 (refer to a black arrow in FIG. 7). Since the inert gas which flows into the sealed container 11 from the inert gas source 31 passes through the moisture reducing means 34 interposed in the enclosing line 30 at this time, moisture contained in the inert gas is reduced and the content of moisture in the inert gas falls.

In accordance with the above, even in a case where the inert gas, with which the internal space of the sealed container 11 is to be filled, contains moisture, the moisture is reduced by the moisture reducing means 34. Therefore, problems such as deterioration of the coating layer on the sensor wires 13 (for example, due to hydrolysis, etc.) or change in sensitivity of the first sensor 10 in association with use of the first sensor 10 can be reduced, for example.

Modification 2 of Second Embodiment

As mentioned above, in some cases, the airtightness of the sealed container 11 attained by sealing the air release pipe 16 only by plastic deformation may be insufficient. Therefore, in the above-mentioned fifth step, after forming the sealed part 16b, the sealed part 16b may be further sealed by welding.

In accordance with the above, the internal space of the sealed container 11 is closed more airtightly by welding of the sealed part 16b, in addition to the sealing by plastic deformation of the air release pipe 16. As a result, the airtightness of the sealed container 11 can be improved further.

Modification 3 of Second Embodiment

However, as mentioned above, in some cases, there may be concern over degradation of airtightness of the sealed part 16b due to a shape change of the sealed part 16b by temperature rising when measuring a flow rate and welding, etc., for example. In such a case, in the above-mentioned fifth step, a cap 16c having an opening and an internal space, in which the sealed part 16b can be housed, and the air release pipe may be further sealed by welding in a state where the sealed part 16b is inserted in the internal space of the cap 16c through the opening after forming the sealed part 16b.

In accordance with the above, the cap 16c including (housing) the sealed part 16b of the air release pipe 16, which has been sealed by plastic deformation, is further sealed by being welded to the air release pipe 16. Thus, since the sealed part 16b itself is not welded, the degradation of airtightness due to a shape change of the sealed part 16b by temperature rising in association with welding can be prevented. Furthermore, the degradation of airtightness as the whole sealed container 11 can be prevented even when the shape of the sealed part 16b changes by temperature rising in association with measurement of a flow rate at a high temperature and thereby the seal in the sealed part 16b is broken, since being further sealed by welding the cap 16c and the air release pipe 16 as mentioned above.

Modification 4 of Second Embodiment

By the way, in the first sensor 10 manufactured by the first method, in order to certainly suppress the disappearance of the coating layer covering the sensor wires 13 wound around the sensor tube 12 in association with use of the first sensor 10 at a high temperature, the airtightness of the sealed container 11 is required to be high. Therefore, the first method can further include an airtightness testing step in which airtightness of the sealed container 11 is investigated.

Although specific techniques for the above-mentioned airtightness testing step is not limited in particular, as for a sealed container, which does not comprise an air release pipe, according to a conventional technology, a technique to detect presence or non-presence of leakage of specific component gas from the inside of the sealed container is adopted generally. Specifically, an inside of an sealed container has been previously filled with gas for detection (tracer gas) which contains a specific component, such as hydrogen (H2), argon (Ar) or helium (He), etc., for example, and this sealed container is left in a chamber during a predetermined time period under a predetermined condition. Thereafter, it is common to investigate airtightness of the sealed container by detecting presence or non-presence of the above-mentioned specific component leaked out to the chamber with a detection means, such as a semiconductor gas sensor, for example. However, in accordance with such a technique, the presence or non-presence of the leakage from the inside of the sealed container can be detected, but a position at which the leakage has occurred cannot be determined.

Figure 8:
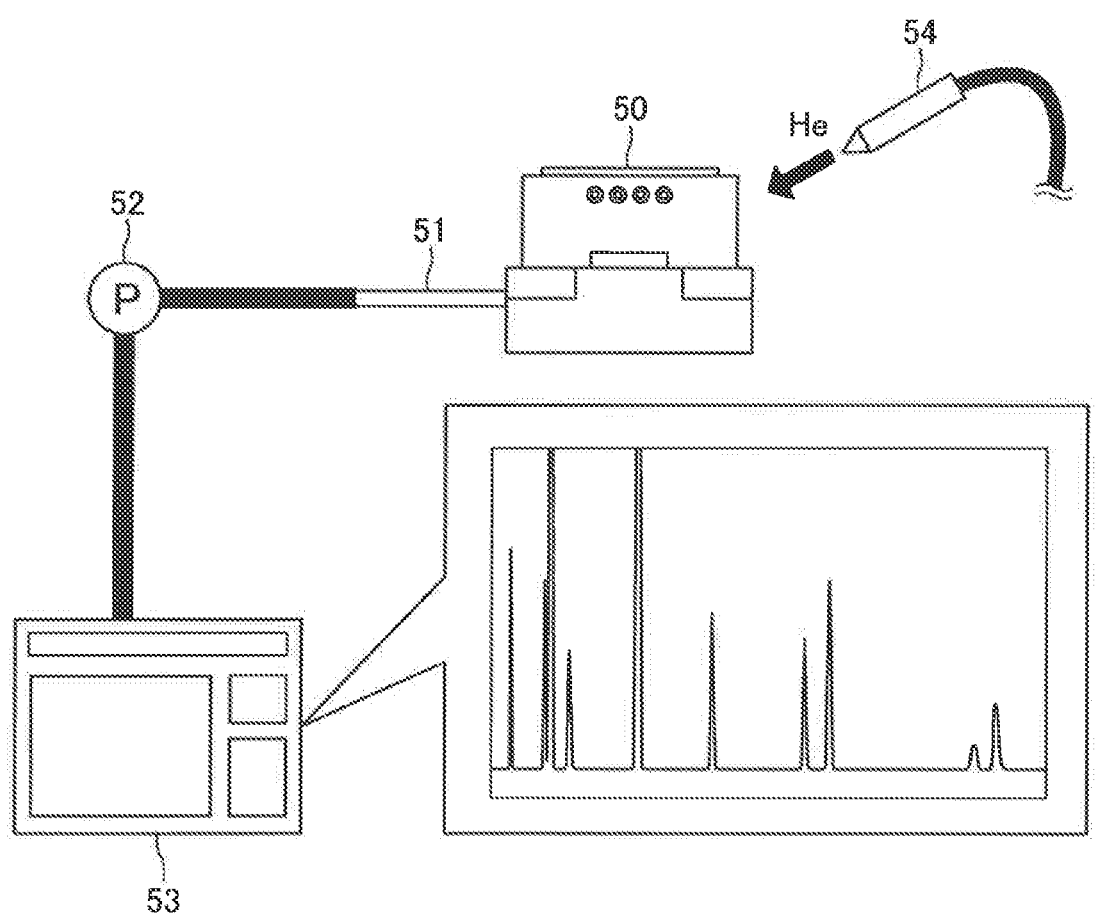
FIG. 8 is a schematic view for showing a leak test of the first sensor in accordance with a vacuum spraying method (spray method) using a helium leak detector.

As specific techniques for airtightness testing, which can determine a position where leakage has occurred, a vacuum spraying method (spray method) using a helium leak detector as shown in FIG. 8, for example, can be mentioned. In this technique, gas for detection (He) is locally supplied to an outer surface of the sealed container 50 using a spray 54, while discharging gas in the internal space of the sealed container 50 through an air release pipe 51 by a pump 52, for example. Then, a position, to which the above-mentioned gas for detection is being supplied when the gas for detection is detected in the above-mentioned gas being discharged by a detection means such as a mass spectroscope 53, etc., is determined as a fault position where airtightness is insufficient.

However, in order to adopt the technique as mentioned above in the airtightness testing on the sealed container 50 according to a conventional technology, which does not comprise an air release pipe, it is necessary to newly prepare an air release pipe 51 in communication with the internal space of the sealed container 50. Therefore, all (total number of) the sealed container 50 cannot be inspected, but a sampling inspection must be adopted. Furthermore, large increase in a manufacturing cost is caused.

However, the thermal mass flow sensor according to the present invention including the first sensor 10 comprises the air release pipe 16 in communication with the internal space of the sealed container 11. Therefore, the airtightness testing in accordance with the vacuum spraying method as mentioned above can be performed, without requiring any particular processing, if it is before sealing the air release pipe 16 in the above-mentioned fifth step.

Then, the first method can further include an airtightness testing step where a position, to which specific gas for detection is being supplied when the specific gas for detection is detected in gas being discharged from the internal space of the sealed container 11 through the air release pipe 16 (by a pressure reducing pump, etc. for example), is determined as a fault position, at which airtightness is insufficient, while locally supplying the specific gas for detection to an outer surface of the sealed container 11, before performing the above-mentioned fifth step.

In accordance with the above, the airtightness testing in accordance with the above-mentioned vacuum spraying method can be performed, without requiring any particular processing. Therefore, the airtightness testing of the sealed container can be performed on all the thermal mass flow sensors manufactured by the first method, while reducing increase in a manufacturing cost.

In addition, although the mass spectroscope 53 is used as the detection means for (the specific component contained in) the gas for a detection in the example shown in the above-mentioned FIG. 8, as a matter of course, a relatively simpler detection means, such as a analyzer tube, which has detectability specific to the specific component can be adopted, for example.

Modification 5 of Second Embodiment

By the way, not only in a case where the inert gas, with which the internal space of the sealed container 11 of the first sensor 10 is filled, contains moisture as mentioned above, but also in a case where a small amount of moisture has adhered to an inner wall of the sealed container 11 or material, such as resin, which constitutes the coating layer on the sensor wire 13, has adsorbed moisture, for example, there is a possibility that it may lead to problems such as deterioration of the coating layer on the sensor wires 13 (for example, due to hydrolysis, etc.) or change in sensitivity of the first sensor 10 in association with use of the first sensor 10.

Then, the first method can perform the above-mentioned fifth step at a temperature higher than a room temperature. In this case, at a temperature higher than a room temperature, air is discharged through the air release pipe 16 from the internal space of the sealed container 11 (refer to the outlined white arrow in FIG. 7). Therefore, even when a small amount of moisture has adhered to the inner wall of the sealed container 11 or materials, such as resin, which constitutes the coating layer on the sensor wire 13, has adsorbed moisture, the moisture is more effectively reduced from the internal space of the sealed container 11, as compared with a case where the fifth step is performed at a room temperature. As a result, the problems such as deterioration of the coating layer on the sensor wires 13 (for example, due to hydrolysis, etc.) or change in sensitivity of the first sensor 10 in association with use of the first sensor 10 can be reduced, for example.

Moreover, in a case where inert gas is enclosed into the internal space through the air release pipe 16 after discharging air through the air release pipe 16 from the internal space of the sealed container 11 in the fifth step, the inert gas is enclosed into the internal space at a temperature higher than a room temperature. Therefore, in a case where the first sensor 10 is used at a temperature higher than a room temperature, a difference between a temperature when filling the inert gas and a temperature when using the first sensor 10 is smaller, as compared with a case where the fifth step is performed at a room temperature. As a result, pressure in the internal space when using the first sensor 10 can be prevented from becoming remarkably higher than atmospheric pressure.

In the above, fundamentally, the higher the temperature when performing the fifth step is, the more effectively the moisture is reduced from the internal space of the sealed container 11. However, when the fifth step is performed at excessively high temperature, there is a possibility that it may lead to problems such as deterioration of resin, etc., which constitutes the coating layer on the sensor wires 13 or discoloring of stainless steel which constitutes the sealed container 11, for example. From such a viewpoint, more preferably, the fifth step is performed at a temperature higher than a room temperature and not higher than 200° C.

Third Embodiment

As mentioned above, the present invention also relates to a thermal mass flow meter which uses the thermal mass flow sensor according to the present invention. Hereafter, a thermal mass flow meter according to a third embodiment of the present invention (which may be referred to as a "first flow meter" hereafter) will be explained referring to drawings.

Figure 9:
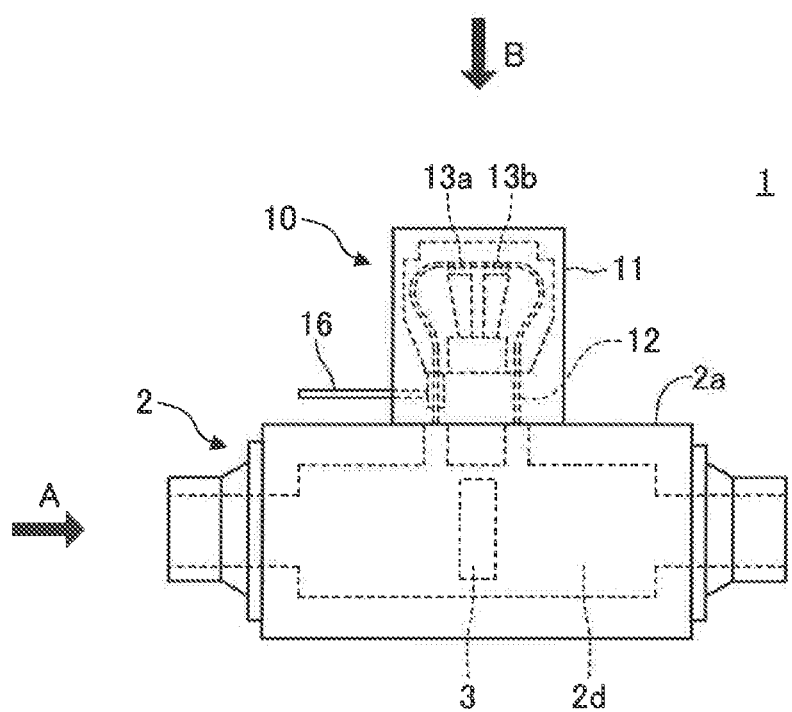
FIG. 9 is a schematic front view of a thermal mass flow meter according to a third embodiment of the present invention (first flow meter) observed from a direction intersecting perpendicularly with an axis of a fluid channel prepared in a base.
Figure 10:
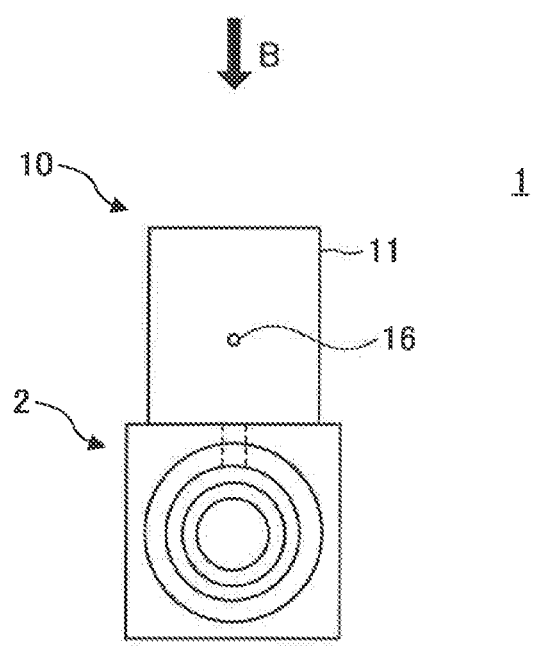
FIG. 10 is a schematic side view of the first flow meter observed from a direction of an arrow A shown in FIG. 9.
Figure 11:
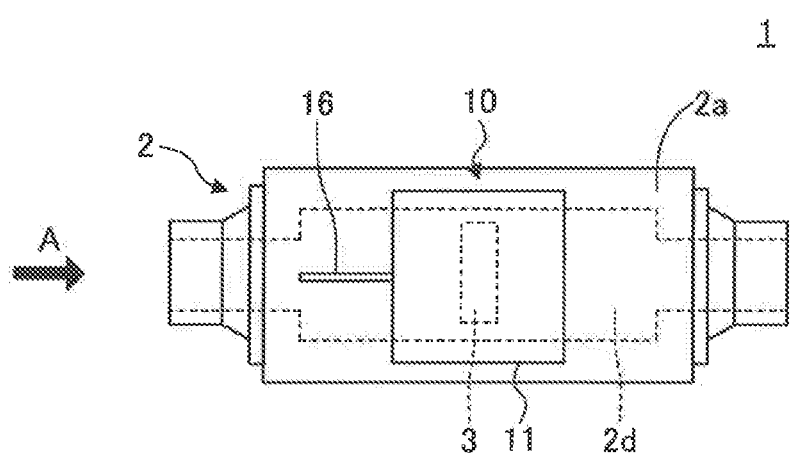
FIG. 11 is a schematic plan view (top view) of the first flow meter observed from a direction of an arrow B shown in FIG. 9.

FIG. 9 is a schematic front view of the first flow meter observed from a direction intersecting perpendicularly with an axis of a fluid channel prepared in a base. FIG. 10 is a schematic side view of the first flow meter observed from a direction of an arrow A shown in FIG. 9. FIG. 11 is a schematic plan view (top view) of the first flow meter observed from a direction of an arrow B shown in FIG. 9.

In FIG. 9 to FIG. 11, for the purpose of easy understanding about a configuration of the first flow meter 1, a channel 2*d*, a bypass 3, a sensor tube 12, sensor wires 13*a* and 13*b*, etc., prepared in the inside are illustrated by broken lines. However, in FIG. 10 and FIG. 11, the sensor tube 12 and the sensor wires 13*a* and 13*b* are omitted.

As shown in FIG. 9 to FIG. 11, the first flow meter 1 comprises a base 2 which has one installation surface 2*a* and has a channel 2*d* for fluid prepared in the inside of the base 2, a bypass 3 disposed in the middle of the channel 2*d*, the first sensor 10, and a sensor circuit (not shown) including a bridge circuit constituted by the sensor wires 13*a* and 13*b* and other resistive elements (not shown) which the first sensor 10 comprises. The sensor tube 12 is configured so as to branch from the channel 2*d* on an upstream side of the bypass 3 and to join the channel 2*d* on a downstream side of the bypass 3 after bypassing outside the installation surface 2*a*.

As mentioned above, the first flow meter 1 adopts the first sensor 10 as a thermal mass flow sensor. Thereby, as already mentioned regarding the first sensor 10, aging variation due to deterioration of the coating layer on the sensor wires in association with the use of the thermal mass flow meter can be suppressed, without causing increase of a manufacturing cost and/or degradation of processing accuracy of the sealed container.

Since the configurations of the first sensor 10 and its various modifications have been already explained in detail, the explanation thereof is omitted here. Moreover, since a general configuration of a thermal mass flow meter is well known to a person skilled in the art, a more detailed explanation is omitted here. Moreover, the thermal mass flow sensor which constitutes a thermal mass flow meter according to the present invention is not limited to the first sensor 10, and various thermal mass flow sensors according to the present invention can be used.

Modification 1 of Third Embodiment

By the way, for example, in a manufacturing process of a semiconductor, etc., gas easy to be condensed (liquidized or solidified) at a normal temperature (which may be referred to as "condensible gas" hereafter), such as vaporized gas of certain kinds of liquid material and sublimated gas of certain kinds of solid material, may be used as process gas. In such a case, entire pipeline reaching a chamber in a manufacturing process of a semiconductor must be heated and held at a temperature higher than a critical temperature such that process gas to be supplied into the chamber is not condensed in the pipeline. The above-mentioned channel 2d for fluid prepared in the inside of the base 2 is also included in this pipeline.

However, as mentioned above, in the first flow meter 1, the first sensor 10 is disposed on the installation surface 2a of the base 2 having a channel 2d prepared inside thereof. Namely, the sensor tube 12 is prepared so as to protrude out of the base 2. For this reason, the first sensor 10 comprising the sensor tube 12 is easy to be cooled by influence of an environmental temperature around the first flow meter 1. As a result, there is a possibility that it may become difficult to maintain the temperature of the gas flowing through the sensor tube 12 at a high temperature and it may lead to problems such as condensation of the gas in the inside of the sensor tube 12, for example.

Figure 12:
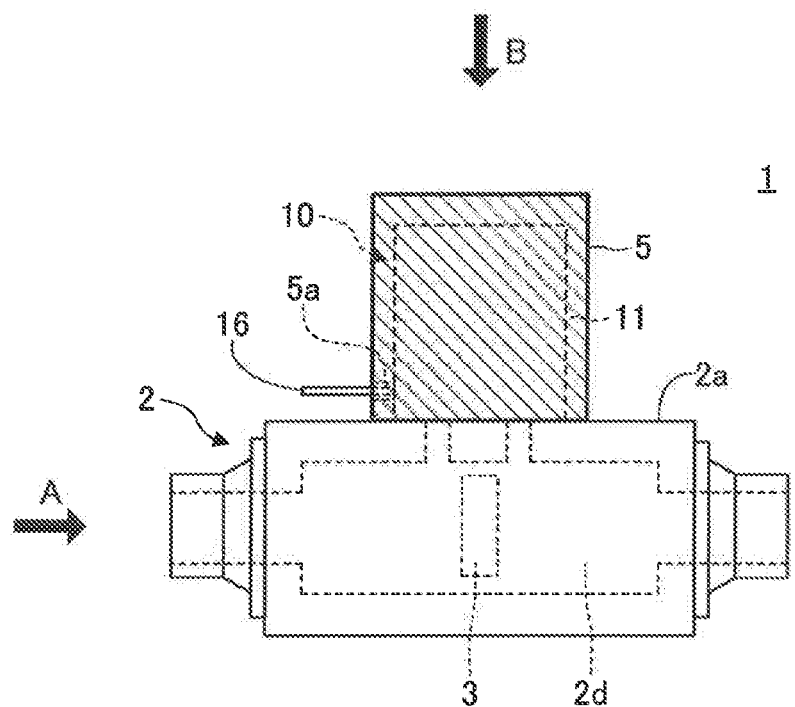
FIG. 12 is a schematic front view of the first flow meter according to the modification 1 of the third embodiment of the present invention observed from a direction intersecting perpendicularly with an axis of a fluid channel prepared in a base.
Figure 13:
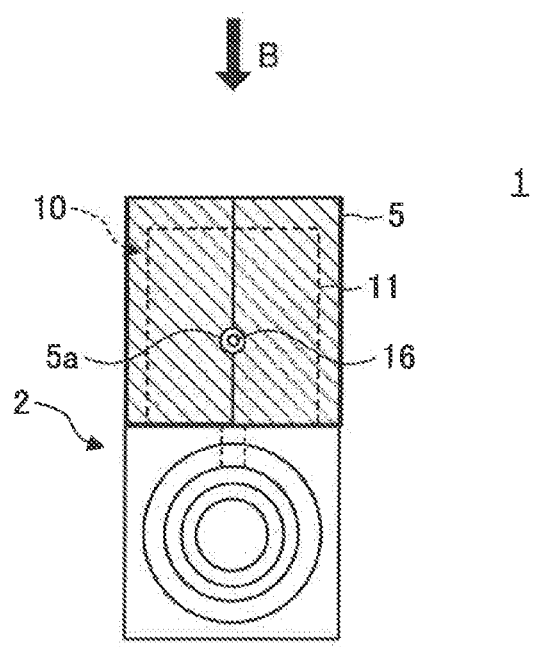
FIG. 13 is a schematic side view of the first flow meter observed from a direction of an arrow A shown in FIG. 12.
Figure 14:
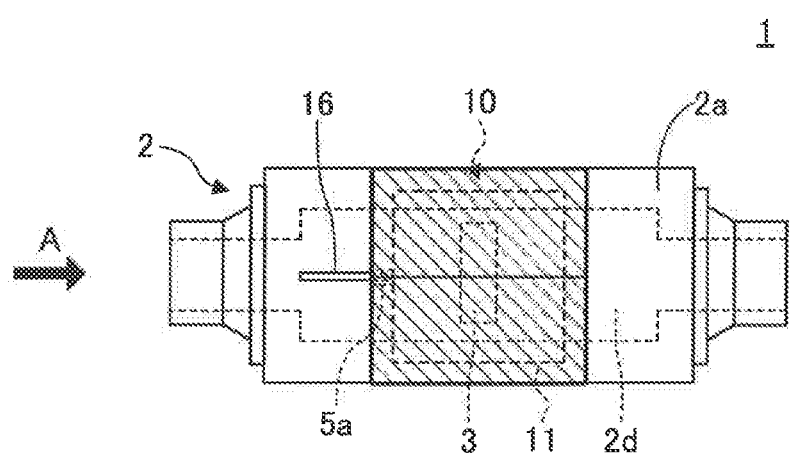
FIG. 14 is a schematic plan view (top view) of the first flow meter observed from a direction of an arrow B shown in FIG. 12.

Then, the first flow meter 1 according to the modification 1 of the third embodiment of the present invention may further comprise a member (heat conductive block) which conducts heat from the base 2 to the sealed container 11 of the first sensor 10. FIG. 12 is a schematic front view of the first flow meter according to the modification 1 of the third embodiment of the present invention observed from a direction intersecting perpendicularly with an axis of a fluid channel prepared in a base. FIG. 13 is a schematic side view of the first flow meter observed from a direction of an arrow A shown in FIG. 12. FIG. 14 is a schematic plan view (top view) of the first flow meter observed from a direction of an arrow B shown in FIG. 12.

In FIG. 12 to FIG. 14, for the purpose of easy understanding about a configuration of the first flow meter 1, the channel 2d, the bypass 3, the first sensor 10, the sealed container 11, (a part of) the air release pipe 16, and a through-hole 5a formed in a heat conductive block 5 (which will be mentioned later) for inserting the air release pipe 16 therethrough, etc., prepared in the inside are illustrated by broken lines. In addition, unlike in the above-mentioned FIG. 9, the sensor tube 12 and the sensor wires 13a and 13b are omitted in FIG. 12 to FIG. 14. Regions, to which hatching is given with downward-sloping line (backslashes), in FIG. 12 to FIG. 14 exemplify embodiments of the heat conductive block 5.

The first flow meter 1 according to the modification 1 of the third embodiment of the present invention further comprises a heat conductive block 5 which is formed of heat conductive material and is disposed at a position adjacent to the sealed container 11 to contact with the installation surface 2a. A bottom surface of the heat conductive block 5 and the installation surface 2a are in surface contact with each other, and at least one of side surfaces of the heat conductive block 5 and a side surface of the sealed container 11 are in surface contact with each other. In the first flow meter 1 shown in FIG. 12 to FIG. 14, the heat conductive block 5 is in surface contact with the side surface and upper surface (top face) of the sealed container 11 and the installation surface 2a of the base 2. Herein, the "surface contact" means a state where a position (region) at which one object and another object are contact with each other is constituted by a plane and both of them are in contact with each other without any gap.

When the surface of the heat conductive block 5 is in surface contact with both of the installation surface 2a of the base 2 and the side surface (and top face) of the sealed container 11, heat can be conducted from the installation surface 2a of the base to the sealed container 11 through the heat conductive block 5 smoothly, and a temperature difference between the base 2 and the sealed container 11 decreases. Thereby, a temperature difference between the channel 2d formed in the inside of the base 2 and the sensor tube 12 housed in the inside of the sealed container 11 also decreases.

It is desirable that the heat conductive block 5 is constituted by material which has as high thermal conductivity as possible. Therefore, the heat conductive block 5 is formed of heat conductive material. In the present specification, heat conductive material refers to material which has a high thermal conductivity (namely, good conductor of heat), and has a thermal conductivity higher than that of stainless steel, at least. Specifically, copper, aluminum, or alloy containing copper or aluminum can be used. As specific examples of the alloy containing copper or aluminum which can be used suitably for the heat conductive block 5, pure aluminum for industrial use (those with an international aluminum-alloy name in the 1000s) excellent in thermal conductivity and Al—Mg-based alloy (those with an international aluminum-alloy name in the 5000s) excellent in strength and processability (workability), etc. can be mentioned.

The heat conductive block 5 needs to be disposed at a position adjacent to the sealed container 11 to contact with the installation surface 2a of the base 2. Thereby, heat can be efficiently conducted from the installation surface 2a toward the sealed container 11. It is desirable that the heat conductive block 5 is disposed so as to cover the entire external surface (except for a bottom surface in contact with the installation surface 2a) of the sealed container 11 as shown in FIG. 12 to FIG. 14. However, as long as heat can be smoothly conducted from the installation surface 2a of the base to the sealed container 11 through the heat conductive block 5, embodiments of the heat conductive block 5 are not limited in particular. Specifically, even in a case where the heat conductive block 5 cannot be disposed so as to cover the entire external surface of the sealed container 11 and a part of the external surface of the sealed container 11 is exposed due to a positional relation with other components which constitute the thermal mass flow meter, etc., the heat conductive block 5 only has to be prepared at a position adjacent to other part of the external surface of the sealed container 11 and to be in contact with the installation surface 2a of the base 2.

A shape of the heat conductive block 5 can be designed in any shapes. Moreover, the heat conductive block 5 can be configured so as to be able to be divided into a plurality of parts, for convenience of assembling. For example, the heat conductive block 5 exemplified in FIG. 12 to FIG. 14 consists of two parts, and can be assembled by sandwiching the sealed container 11 with them, and can be fixed. In addition, when disposing the heat conductive block 5 so as to cover the surface of the sealed container 11, out of which the air release pipe 16 protrudes, the through-hole 5a, through which the air release pipe 16 is inserted, can be formed in the heat conductive block 5, as exemplified in FIG. 12 to FIG. 14.

In accordance with the above, since the heat conduction between the base 2 and (the sealed container 11 of) the first sensor 10 is promoted by the heat conductive block 5, the first sensor 10 becomes difficult to be cooled by influence of an environmental temperature around the first flow meter 1. As a result, for example, in a case where the pipeline is heated and held such that process gas may not condense in the pipeline when using condensible gas as process gas, it becomes easy to maintain the temperature of the gas flowing through the sensor tube 12 at a desired temperature, and problems such as condensation of the gas in the inside of the sensor tube 12, for example, can be reduced.

Although the case where the pipeline was heated and held such that process gas might not condense in the pipeline when using condensible gas as process gas was explained in the above explanation, for example, in a case where gas having a property which may be deteriorated (decomposed or changed in its nature) at a temperature higher than a certain temperature is used as process gas, the pipeline needs to be cooled and held such that the process gas may not be deteriorated inside the pipeline. Even in such a case, since heat conduction between the base 2 and (the sealed container 11 of) the first sensor 10 is promoted by the heat conductive block 5, the first sensor 10 becomes difficult to be heated by influence of the environmental temperature around the first flow meter 1. As a result, it becomes easy to maintain the temperature of the gas flowing through the sensor tube 12 at a desired temperature, and problems such as deterioration of gas in the inside of the sensor tube 12, for example, can be reduced.

Although not illustrated, the first flow meter 1 may further comprise a heat conduction promotion member that is a member for further promoting heat conduction from the base 2 to the sealed container 11 and/or the heat conductive block 5. As specific examples of such a heat conduction promotion member, heat conductive sheet prepared in contact with the side surface of the base 2 and the side surface of the heat conductive block 5, etc. can be mentioned, for example. As material which forms such heat conductive sheet, the above-mentioned metal material for forming the heat conductive block 5, graphite, and silicone-based material, etc. can be mentioned, for example.

Moreover, the first flow meter 1 may further comprise a heat insulation member that is a member for reducing heat dissipation from at least one of the base 2, the sealed container 11 and the heat conductive block 5. As a specific example of such a heat insulation member, heat insulation sheet disposed so as to cover at least a part of exposed surfaces of the base 2, the sealed container 11 and the heat conductive block 5 can be mentioned, for example. As material which forms such heat insulation sheet, glass fiber hardened with binder can be mentioned, for example.

Modification 2 of Third Embodiment

In the first flow meter 1 according to the modification 1 of the third embodiment, the heat conductive block 5 promotes the heat conduction between the base 2 and (the sealed container 11 of) the first sensor 10 to thereby make it easy to maintain the temperature of the first sensor 10 at a desired temperature. Namely, the heat conductive block 5 does not generate heat actively itself, but plays a passive role which conducts the heat of the base 2 to the sealed container 11.

However, the first flow meter 1 may further comprise a means for maintaining the temperature of the first sensor 10 at a desired temperature by actively heating or cooling the base 2 and/or the heat conductive block 5, in addition to the heat conductive block 5.

Figure 15:
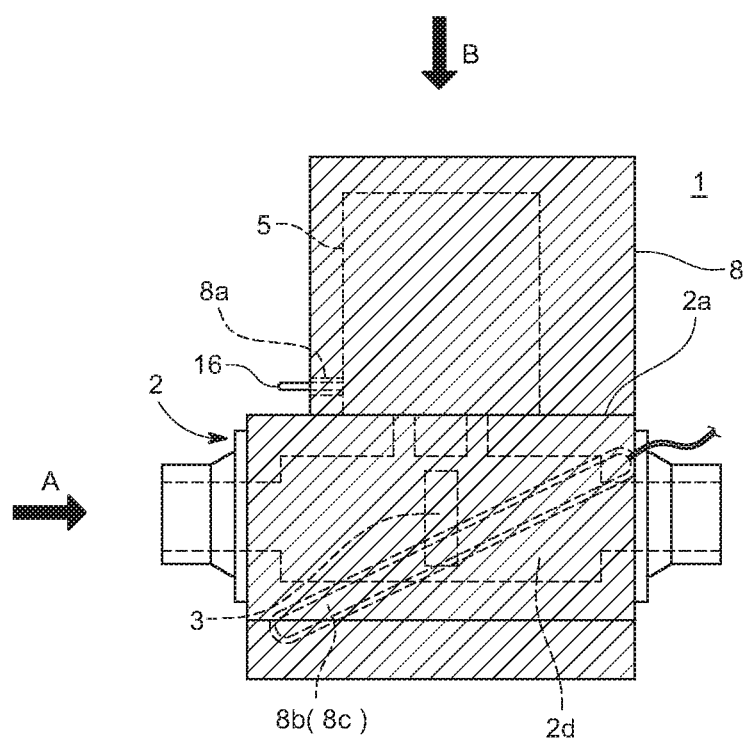
FIG. 15 is a schematic front view of the first flow meter according to the modification 2 of the third embodiment of the present invention observed from a direction intersecting perpendicularly with an axis of a fluid channel prepared in a base.
Figure 16:
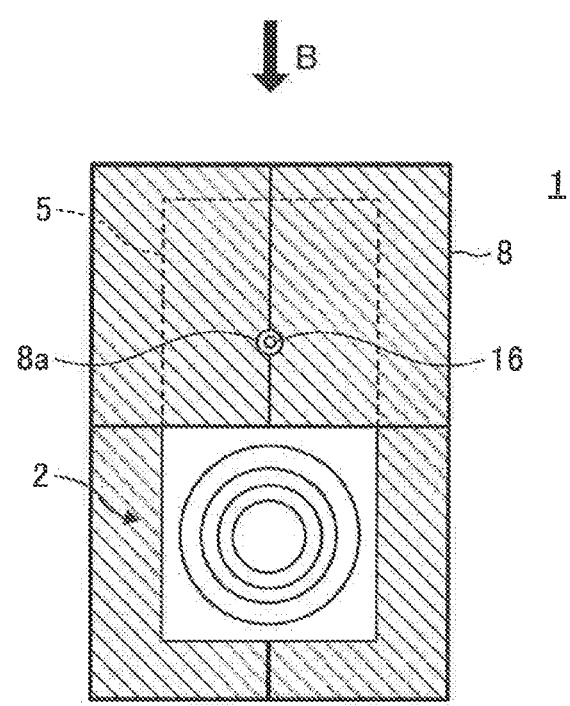
FIG. 16 is a schematic side view of the first flow meter observed from a direction of an arrow A shown in FIG. 15.
Figure 17:
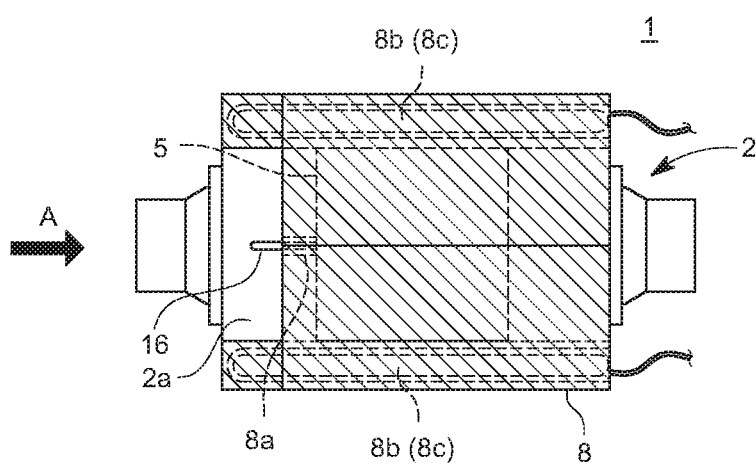
FIG. 17 is a schematic plan view (top view) of the first flow meter observed from a direction of an arrow B shown in FIG. 15.

FIG. 15 is a schematic front view of the first flow meter according to the modification 2 of the third embodiment of the present invention observed from a direction intersecting perpendicularly with an axis of the fluid channel prepared in the base. FIG. 16 is a schematic side view of the first flow meter observed from a direction of an arrow A shown in FIG. 15. FIG. 17 is a schematic plan view (top view) of the first flow meter observed from a direction of an arrow B shown in FIG. 15.

In FIG. 15 to FIG. 17, for the purpose of easy understanding about a configuration of the first flow meter 1, a channel 2d, a bypass 3, (a part of) an air release pipe 16, a through-hole 8a formed in a temperature adjusting block 8 (which will be mentioned later) for inserting the air release pipe 16 therethrough and a heating element (or a cooling element), etc., prepared in the inside are illustrated by broken lines. In addition, unlike in the above-mentioned FIG. 12 to FIG. 14, the first sensor 10 and the sealed container 11, etc. are omitted in FIG. 15 to FIG. 17. Regions to which hatching is given with upward-sloping line (slashes) in FIG. 15 to FIG. 17 exemplify embodiments of the temperature adjusting block 8.

The first flow meter 1 according to the modification 2 of the third embodiment of the present invention further comprises the temperature adjusting block 8 which is disposed so as to be in contact with a side surface of at least either one of the base 2 and the heat conductive block 5, in addition to the above-mentioned heat conductive block 5. The temperature adjusting block 8 is formed of heat conductive material, and has a heating element 8b which heats the temperature adjusting block 8 and/or a cooling element 8c which cools the temperature adjusting block 8. In the first flow meter 1 shown in FIG. 15 to FIG. 17, the temperature adjusting block 8 is in surface contact with a side surface and an upper surface (top face) of the heat conductive block 5 and a side surface and a bottom surface of the base 2.

However, as long as it is possible to maintain the temperature of the first sensor 10 at a desired temperature by actively heating or cooling the base 2 and/or the heat conductive block 5, the arrangement and shape of the temperature adjusting block 8 are not limited in particular. Moreover, although the temperature adjusting block 8 is constituted so as to be able to be divided into a plurality of members in the example shown in FIG. 15 to FIG. 17, unless inconvenience in assembling, etc. is accompanied, for example, the shape and number of members which constitute the temperature adjusting block 8 can be determined properly. In addition, similarly to the heat conductive block 5, when disposing the temperature adjusting block 8 so as to cover the surface of the sealed container 11, out of which the air release pipe 16 protrudes, the through-hole 8a, through which the air release pipe 16 is inserted, can be formed in the temperature adjusting block 8, as exemplified in FIG. 15 to FIG. 17.

Similarly to the heat conductive block 5, it is desirable that the temperature adjusting block 8 is also constituted by material which has as high thermal conductivity as possible. Therefore, the temperature adjusting block 8 is also formed of heat conductive material. As specific examples of the heat conductive material which can be used suitably for the temperature adjusting block 8, silicon rubber and ceramics, etc. can be mentioned in addition to the above-mentioned metal material which forms the heat conductive block 5, for example.

The heating element 8b is an element or apparatus which generates thermal energy and, as specific examples thereof, a cartridge heater including nichrome wire, etc. can be mentioned, for example. On the other hand, the cooling element 8c is an element or apparatus which absorbs thermal energy and, as specific examples thereof, a Peltier element, etc. can be mentioned, for example.

Therefore, when the base 2 and/or the heat conductive block 5 are to be heated, as specific examples of the temperature adjusting block 8, for example, a member in a shape of plate or block formed of aluminum alloy with the heating element 8b, such as a rodlike cartridge heater including nichrome wire, inserted therein, a rubber heater that is a member in a shape of plate or block formed of silicon rubber with the heating element 8b prepared therein, and a plate heater that is a member in a shape of plate or block formed of ceramics with the heating element 8b prepared therein, etc. can be used suitably.

On the other hand, when the base 2 and/or the heat conductive block 5 are to be cooled, as specific examples of the temperature adjusting block 8, for example, a member in a shape of plate or block formed of aluminum alloy with the cooling element 8c, such as a Peltier element, inserted therein and/or attached thereto, a rubber cooler that is a member in a shape of plate or block formed of silicon rubber with the cooling element 8c prepared therein, and a plate cooler that is a member in a shape of plate or block formed of ceramics with the cooling element 8c prepared therein, etc. can be used suitably.

In accordance with the above, since the base 2 and/or the heat conductive block 5 can be actively heated or cooled by the temperature adjusting block 8, it becomes further easier to maintain the temperature of the first sensor 10 at a desired temperature regardless of an environmental temperature around the first flow meter 1. As a result, problems such as condensation and deterioration of gas in the inside of the sensor tube 12 can be reduced, for example.

Although not illustrated, this first flow meter 1 may further comprise a heat conduction promotion member that is a member for further promoting heat conduction from the temperature adjusting block 8 to the base 2 and/or the sealed container 11 and/or the heat conductive block 5. As specific examples of such a heat conduction promotion member, heat conductive sheet prepared in contact with any of the surfaces of the temperature adjusting block 8 and any of the surfaces of the base 2 and/or the sealed container 11 and/or the heat conductive block 5, etc. can be mentioned, for example. As material which forms such heat conductive sheet, the above-mentioned metal material for forming the heat conductive block 5, graphite, and silicone-based material, etc. can be mentioned, for example.

Moreover, this first flow meter 1 may further comprise a heat insulation member that is a member for reducing heat dissipation from at least one of the temperature adjusting block 8, the base 2, the sealed container 11 and the heat conductive block 5. As a specific example of such a heat insulation member, heat insulation sheet disposed so as to cover at least a part of exposed surfaces of the temperature adjusting block 8, the base 2, the sealed container 11 and the heat conductive block 5 can be mentioned, for example. As material which forms such heat insulation sheet, glass fiber hardened with binder can be mentioned, for example.

Modification 3 of Third Embodiment

The above-mentioned first flow meter 1 according to the modification 2 of the third embodiment can actively heat or cool the base 2 and/or the heat conductive block 5 by the temperature adjusting block 8 comprising the heating element 8b and/or the cooling element 8c, in addition to the heat conductive block 5. Thereby, it becomes further easier to maintain the temperature of the first sensor 10 at a desired temperature regardless of an environmental temperature around the first flow meter 1, and problems such as condensation and deterioration of gas in the inside of the sensor tube 12 can be reduced, for example.

By the way, in control for maintaining the temperature of the first sensor 10 at a desired temperature as mentioned above, an operating state and a stopped state of the heating element 8b and/or the cooling element 8c which the temperature adjusting block comprises are switched according to a relation between the temperature of the first sensor 10 and a target temperature.

On the other hand, as mentioned above, the first sensor 10 comprises the air release pipe 16 that is a pipe which brings the internal space and outside of the sealed container 11 in airtight communication with each other. The air release pipe 16 is formed of material which can tolerate not only of measurement conditions (for example, temperature and pressure, etc.) of a mass flow rate of the fluid to be measured, but also a pressure difference between the inside and outside of the pipe when discharging air from the internal space of the sealed container 11. Typically, a steel pipe made of stainless steel is used as the air release pipe 16. Therefore, the air release pipe 16 can act also as a heat conduction path which conducts heat between the internal space and outside of the sealed container 11.

As a result, a transitional temperature change of the temperature adjusting block 8 in association with switching between an operating state and a stopped state of the heating element 8b and/or the cooling element 8c may be transmitted to the internal space of the sealed container 11 through the air release pipe 16, and may affect a detection result of a mass flow rate by the first sensor 10, for example. This phenomenon becomes more remarkable in a case where the air release hole 16a is formed at an asymmetrical position with respect to the pair of the sensor wires 13a and 13b in a heat conduction path in the first sensor 10, such as a case where the position of the air release hole 16a (corresponding to the end of the air release pipe 16 on the side of the internal space of the sealed container 11) in the first sensor 10 is closer to either one of the pair of the sensor wires 13a and 13b, etc., for example.

Then, in the first flow meter 1 according to the modification 3 of the third embodiment of the present invention, the air release hole is arranged at a position symmetrical with respect to the pair of the sensor wires in a heat conduction path in the thermal mass flow sensor. In other words, this first flow meter 1 is configured such that heat is similarly transmitted from the air release hole 16a corresponding to the end of the air release pipe 16 on the side of the internal space of the sealed container 11 to each of the pair of the sensor wires 13a and 13b.

Figure 18:
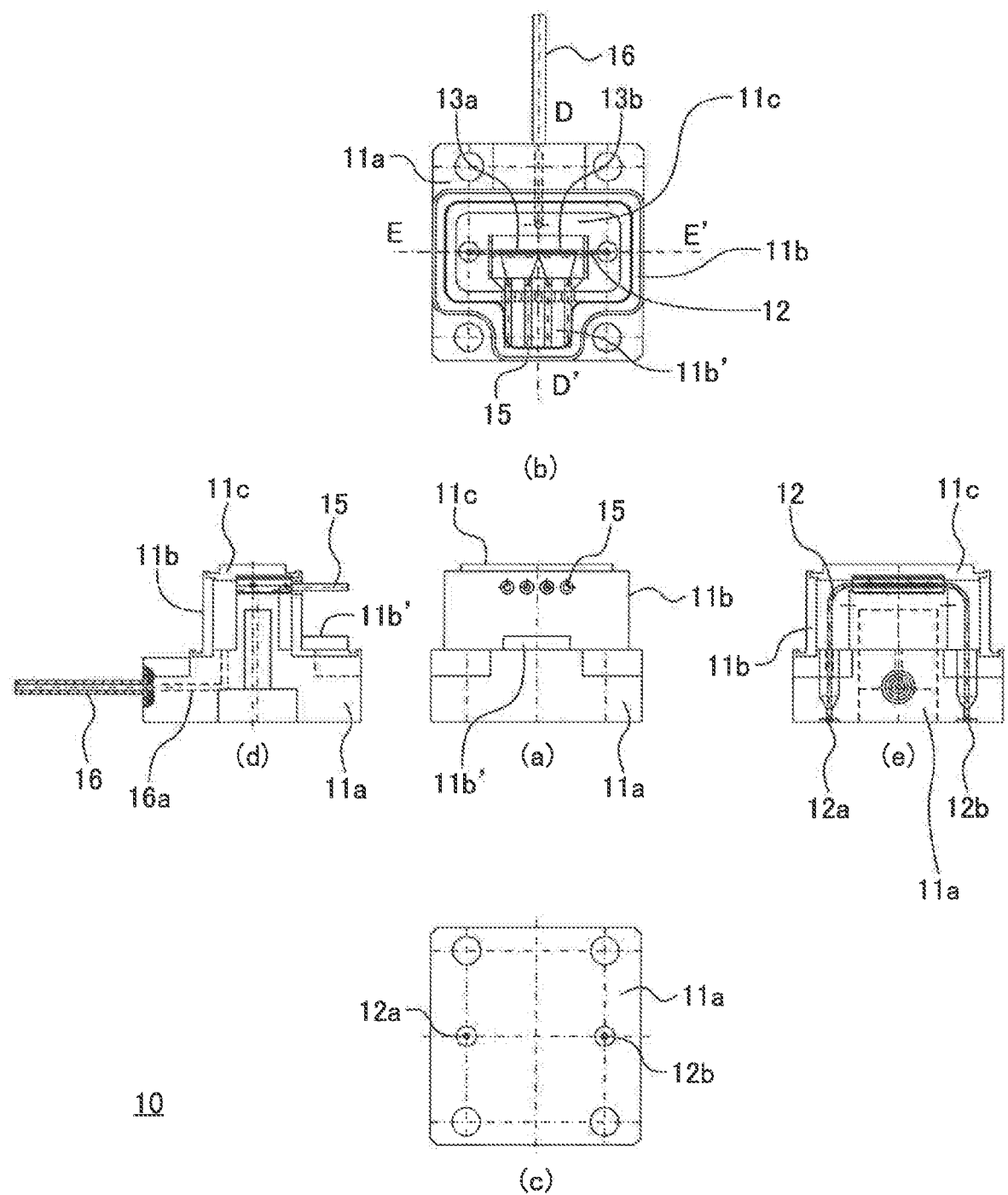
FIG. 18 is (a) a front view, (b) a top view (perspective projection), (c) a bottom view, (d) a sectional view along a plane D-D' observed from the left side, and (e) a sectional view along a plane E-E' observed from the front, of the first flow meter according to the modification 3 of the third embodiment of the present invention.

Specifically, for example, like an example shown in FIG. 18, by constituting the first sensor 10 such that the air release pipe 16 and the air release hole 16a are on an symmetric axis of the pair of the sensor wires 13a and 13b, the air release hole 16a can be arranged at a "symmetrical position with respect to the pair of the sensor wires 13a and 13b in the heat conduction path." Although the air release pipe 16 is disposed on the left side surface of the constitutional member 11a of the sealed container 11 in the example shown in FIG. 2, the air release pipe 16 is disposed in the center of the back surface of the constitutional member 11a of the sealed container 11 in the example shown in FIG. 18.

However, as long as heat can be similarly transmitted from the air release hole 16a to each of the pair of the sensor wires 13a and 13b, the arrangement of the air release pipe 16 and the air release hole 16a is not limited in particular. For example, when a large portion or all of heat conducted through the air release pipe 16 is transmitted to the pair of the sensor wires 13a and 13b through a periphery of the air release hole 16a, as long as at least the air release hole 16a is on the symmetric axis of the pair of the sensor wires 13a and 13b, the air release pipe 16 may not be on the symmetric axis.

In accordance with the above, the heat conducted through the air release pipe 16 and the air release hole 16a is similarly transmitted to each of the pair of the sensor wires 13a and 13b. As a result, the problem that a transitional temperature change of the temperature adjusting block 8 in association with switching between an operating state and a stopped state of the heating element 8b and/or the cooling element 8c is transmitted to the internal space of the sealed container 11 through the air release pipe 16 to affect a detection result of a mass flow rate by the first sensor 10, for example, etc., can be reduced.

Modification 4 of Third Embodiment

In the above-mentioned modification 3 of the third embodiment, the problem that a transitional temperature change of the temperature adjusting block 8 in association with switching between an operating state and a stopped state of the heating element 8b and/or the cooling element 8c is transmitted to the internal space of the sealed container 11 through the air release pipe 16 to affect a detection result of a mass flow rate by the first sensor 10, for example, etc., is reduced by configuring such that the heat conducted through the air release pipe 16 and the air release hole 16a is similarly transmitted to each of the pair of the sensor wires 13a and 13b. However, if heat conduction between the heat conductive block 5 and/or temperature adjusting block 8 and the air release pipe 16 can be reduced, the above-mentioned problems should be able to be reduced fundamentally.

Then, in the first flow meter 1 according to a modification 4 of the third embodiment of the present invention, the heat conduction between the heat conductive block 5 and/or temperature adjusting block 8 and the air release pipe 16 is reduced by spatially separating the heat conductive block 5 and/or the temperature adjusting block 8 from the air release pipe 16. Specifically, in this first flow meter 1, the through-hole 5a and the through-hole 8a, through which the air release pipe is inserted, are formed in the heat conductive block 5 and the temperature adjusting block 8, respectively. In addition, the shortest distance between an outside surface of the air release pipe 16 and inside surfaces of the through-hole 5a and the through-hole 8a is 1 millimeter or more.

In accordance with the above, since the heat conductive block 5 and/or the temperature adjusting block 8 are separated spatially from the air release pipe 16, the heat conduction between the heat conductive block 5 and/or temperature adjusting block 8 and the air release pipe 16 can be reduced. As a result, since the heat conduction between the internal space and outside of the sealed container 11 through the air release pipe 16 can be reduced, the above-mentioned problem can be reduced fundamentally.

Modification 5 of Third Embodiment

The first flow meter 1 according to a modification 5 of the third embodiment of the present invention is the first flow meter 1 according to the above-mentioned modification 4 of the third embodiment, wherein heat insulating material is filled between the outside surface of the air release pipe 16 and the inside surfaces of the through-hole 5a and the through-hole 8a.

In accordance with the above, the heat conduction between the heat conductive block 5 and/or temperature adjusting block 8 and the air release pipe 16 can be further reduced with the heat insulating material. As a result, since the heat conduction between the internal space and outside of the sealed container 11 through the air release pipe 16 can be reduced further, the above-mentioned problem can be reduced more certainly.

In addition, as being well known to a person skilled in the art, a thermal mass flow controller can be constituted by combining the thermal mass flow meter according to the present invention (present invention flow meter) with a flow control valve, an actuator which increases and decreases an opening of the flow control valve and a control device which controls the opening of the flow control valve using the actuator so as to bring a flow rate of fluid detected by the present invention flow meter close to a target value. Therefore, the present invention relates not only to the above-mentioned thermal mass flow sensors and the thermal mass flow meters, but also to the thermal mass flow controllers using the present invention flow meter.

Although some embodiments and modifications which have a specific configuration have been explained, sometimes referring to accompanying drawings, as the above, for the purpose of explaining the present invention, it should not be interpreted that the scope of the present invention is limited to these exemplary embodiments and modifications, and it is needless to say that modifications can be properly added within the limits of the matter described in the claims and the specification.

The invention claimed is:

1. A thermal mass flow sensor comprising:
   a sealed container, a sensor tube which communicates airtightly with an inlet and an outlet formed in an outer wall defining an internal space of said sealed container and is housed in said internal space of said sealed container, a pair of sensor wires wound around said sensor tube, a coating layer covering at least a part of said sensor wires, which are wound around said sensor tube, and a hermetic connector which is disposed on said outer wall and electrically connects both ends of each of the pair of said sensor wires with external electrodes disposed outside said sealed container, and
   said internal space of said sealed container is sealed so as to be an inert atmosphere, wherein:
   said thermal mass flow sensor further comprises:
      an air release pipe that is a pipe which brings said internal space and outside of said sealed container in airtight communication with each other through an air release hole that is a through-hole formed in said outer wall, and
      a cap having an opening and an internal space, in which a sealed part can be housed, and
      an end of said air release pipe on an opposite side to said air release hole is sealed by plastic deformation to form said sealed part, and
      said cap and said air release pipe are further sealed by welding in a state where said sealed part is inserted in said internal space of said cap through said opening.

2. The thermal mass flow sensor according to claim 1, wherein:
   said sealed part is further sealed by welding.

3. A method of manufacturing a thermal mass flow sensor, said thermal mass flow sensor comprising:
   a sealed container, a sensor tube which communicates airtightly with an inlet and an outlet formed in an outer wall defining an internal space of said sealed container and is housed in said internal space of said sealed container, a pair of sensor wires wound around said sensor tube, a coating layer which covers at least a part of said sensor wires, which are wound around said sensor tube, and a hermetic connector which disposed on said outer wall and electrically connects both ends of each of the pair of said sensor wires with external electrodes which are disposed outside said sealed container, and said internal space of said sealed container is sealed so as to be an inert atmosphere, said thermal mass flow sensor further comprises;

an air release pipe that is a pipe which brings said internal space and outside of said sealed container in airtight communication with each other through an air release hole that is a through-hole formed in said outer wall, and a cap having an opening and an internal space, in which a sealed part can be housed, and an end of said air release pipe on an opposite side to said air release hole is sealed by plastic deformation to form said sealed part, and said cap and said air release pipe are further sealed by welding in a state where said sealed part is inserted in said internal space of said cap through said opening, said method including:

a first step where said sensor tube, around which the pair of said sensor wires is wound, is welded to a first member that is a member in which said inlet and said outlet are formed, among a plurality of members constituting said sealed container, such that said inlet and said outlet are in airtight communication with both ends of said sensor tube, a second step where both ends of each of the pair of said sensor wires are electrically connected to corresponding terminals of said hermetic connector, respectively, in a second member that is a member in which said hermetic connector is disposed, among the plurality of said members constituting said sealed container, a third step where said air release pipe is welded to a third member that is a member in which said air release hole is formed, among the plurality of said members constituting said sealed container, such that said air release pipe is in airtight communication with said internal space of said sealed container through said air release hole, a fourth step where the plurality of said members constituting said sealed container is welded with one another to form said sealed container, and a fifth step wherein said end of said air release pipe on an opposite side to said air release hole is sealed by plastic deformation to form said sealed part, after discharging air from said internal space through said air release pipe, and in said fifth step, a cap having an opening and an internal space, in which said sealed part can be housed, and said air release pipe are further sealed by welding in a state where said sealed part is inserted in said internal space of said cap through said opening after forming said sealed part.

4. The method for manufacturing a thermal mass flow sensor according to 3, wherein:

in said fifth step, the end of said air release pipe on an opposite side to said air release hole is sealed by plastic deformation to form said sealed part, after enclosing inert gas in said internal space through said air release pipe after discharging air from said internal space through said air release pipe.

5. The method for manufacturing a thermal mass flow sensor according to claim 4, wherein:

in said fifth step, said inert gas whose moisture content has been lowered by a moisture reducing means which reduces moisture contained in said inert gas is enclosed into said internal space through said air release pipe, after discharging air from said internal space through said air release pipe.

6. The method for manufacturing a thermal mass flow sensor according to claim 3, wherein:

in said fifth step, said sealed part is further sealed by welding after forming said sealed part.

7. The method for manufacturing a thermal mass flow sensor according to claim 3, further including:

an airtightness testing step where a position, to which specific gas for detection is being supplied when said specific gas for detection is detected in gas being discharged from said internal space through said air release pipe, is determined as a fault position, at which airtightness is insufficient, while locally supplying said specific gas for detection to an outer surface of said sealed container, before performing said fifth step.

8. The method for manufacturing a thermal mass flow sensor according to claim 3, wherein:

said fifth step is performed at a temperature higher than a room temperature.

9. The method for manufacturing a thermal mass flow sensor according to claim 8, wherein:

said fifth step is performed at a temperature higher than a room temperature and not higher than 200° C.

10. A thermal mass flow meter comprising:

a base which has one installation surface and has a channel for fluid prepared in the inside of said base, a bypass disposed in the middle of said channel, a thermal mass flow sensor including:

a sealed container, a sensor tube which communicates airtightly with an inlet and an outlet formed in an outer wall defining an internal space of said sealed container and is housed in said internal space of said sealed container, a pair of sensor wires wound around said sensor tube, a coating layer covering at least a part of said sensor wires, which are wound around said sensor tube, and a hermetic connector which is disposed on said outer wall and electrically connects both ends of each of the pair of said sensor wires with external electrodes disposed outside said sealed container, and said internal space of said sealed container is sealed so as to be an inert atmosphere, wherein:

said thermal mass flow sensor further comprises;

an air release pipe that is a pipe which brings said internal space and outside of said sealed container in airtight communication with each other through an air release hole that is a through-hole formed in said outer wall, and a cap having an opening and an internal space, in which a sealed part can be housed, and an end of said air release pipe on an opposite side to said air release hole is sealed by plastic deformation to form said sealed part, and said cap and said air release pipe are further sealed by welding in a state where said sealed part is inserted in said internal space of said cap through said opening; and a sensor circuit including a bridge circuit constituted by said sensor wires and other resistive elements, wherein said sensor tube is configured so as to branch from said channel on an upstream side of said bypass and to join said channel on a downstream side of said bypass after bypassing outside said installation surface.

11. The thermal mass flow meter according to claim 10, further comprising:
   a heat conductive block which is formed of heat conductive material and is disposed at a position adjacent to said sealed container to contact with said installation surface,
   a bottom surface of said heat conductive block and said installation surface are in surface contact with each other, and
   at least one of side surfaces of said heat conductive block and a side surface of said sealed container are in surface contact with each other.

12. The thermal mass flow meter according to claim 11, further comprising:
   a temperature adjusting block which is disposed so as to be in contact with a side surface of at least either one of said base and said heat conductive block, and
   said temperature adjusting block is formed of heat conductive material, and have a heating element which heats said temperature adjusting block and/or a cooling element which cools said temperature adjusting block.

13. The thermal mass flow meter according to claim 12, wherein:
   said air release hole is arranged at a position symmetrical with respect to the pair of said sensor wires in a heat conduction path in said thermal mass flow sensor.

14. The thermal mass flow meter according to claim 12, wherein:
   through-holes, through which said air release pipe is inserted, are formed in said heat conductive block and said temperature adjusting block, and
   the shortest distance between an outside surface of said air release pipe and inside surfaces of said through-holes is 1 millimeter or more.

15. The thermal mass flow meter according to claim 14, wherein:
   heat insulating material is filled between the outside surface of said air release pipe and the inside surfaces of said through-holes.

* * * * *